(12) United States Patent
Ge et al.

(10) Patent No.: US 11,829,293 B2
(45) Date of Patent: Nov. 28, 2023

(54) PROCESSOR AND ARITHMETIC PROCESSING METHOD

(71) Applicants: Fujitsu Limited, Kawasaki (JP); Inter-University Research Institute Corporation Research Organization of Information and Systems, Tachikawa (JP)

(72) Inventors: Yi Ge, Bunkyo (JP); Masahiro Goshima, Chiyoda (JP)

(73) Assignees: Fujitsu Limited, Kawasaki (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 0 days.

(21) Appl. No.: 17/893,333

(22) Filed: Aug. 23, 2022

(65) Prior Publication Data

US 2023/0110696 A1    Apr. 13, 2023

(30) Foreign Application Priority Data

Oct. 7, 2021    (JP) .................................. 2021-165561

(51) Int. Cl.
*G06F 12/0895*    (2016.01)
*G06F 12/0846*    (2016.01)
(Continued)

(52) U.S. Cl.
CPC ...... *G06F 12/0846* (2013.01); *G06F 12/0811* (2013.01); *G06F 12/0844* (2013.01); *G06F 12/0895* (2013.01); *G06F 2212/1021* (2013.01)

(58) Field of Classification Search
None
See application file for complete search history.

(56) References Cited

U.S. PATENT DOCUMENTS

| 5,835,963 A | 11/1998 | Yoshioka et al. |
| 2005/0050277 A1 | 3/2005 | Shen et al. |
| (Continued) | | |

FOREIGN PATENT DOCUMENTS

| JP | 8-320829 A | 12/1996 |
| JP | 2007-504552 A | 3/2007 |
| JP | 2020-536308 A | 12/2020 |

*Primary Examiner* — Charles J Choi
(74) *Attorney, Agent, or Firm* — WHDA, LLP

(57) ABSTRACT

A processor includes request issuing units issuing an access request to a storage, a data array including banks holding sub data divided from data read from the storage based on the access request, a switch to transfer the access request to one of the banks, and first and second determination units. The first determination unit determines a cache hit when a tag address included in the access address matches a tag address held therein in correspondence with an index address included in the access address. The second determination unit determines a cache hit when identification information corresponding to a first tag address included in the access address and a second tag address included in the access address, match identification information and second tag address held therein. A cache controller makes access to the data array or storage, based on a determination result of the first or second determination unit.

16 Claims, 17 Drawing Sheets

(51) Int. Cl.
*G06F 12/0811* (2016.01)
*G06F 12/0844* (2016.01)

(56) References Cited

U.S. PATENT DOCUMENTS

2014/0289475 A1* 9/2014 Kokuryo ............... G06F 12/128
  711/133
2019/0108025 A1   4/2019 Lloyd et al.

* cited by examiner

FIG.16

(SIZE OF CACHE: 64 KB, NUMBER OF BITS OF PHYSICAL ADDRESS: 52 bits)

| NUMBER OF WAYS | CACHE LINE SIZE [bits] | NUMBER OF BANKS | (a) NUMBER OF BITS OF TAG ARRAY | (b) NUMBER OF BITS OF DATA ARRAY OF EACH BANK | RATIO (a)/(b) |
|---|---|---|---|---|---|
| 1 | 512 | 1 | 36 | 512 | 7% |
|   |   | 2 | 36 | 256 | 14% |
|   |   | 4 | 36 | 128 | 28% |
|   |   | 8 | 36 | 64 | 56% |
|   | 2048 | 1 | 36 | 2048 | 2% |
|   |   | 2 | 36 | 1024 | 4% |
|   |   | 4 | 36 | 512 | 7% |
|   |   | 8 | 36 | 256 | 14% |
|   |   | 16 | 36 | 128 | 28% |
|   |   | 32 | 36 | 64 | 56% |
|   |   | 64 | 36 | 32 | 113% |
| 4 | 2048 | 1 | 38 | 2048 | 2% |
|   |   | 2 | 38 | 1024 | 4% |
|   |   | 4 | 38 | 512 | 7% |
|   |   | 8 | 38 | 256 | 15% |
|   |   | 16 | 38 | 128 | 30% |
|   |   | 32 | 38 | 64 | 59% |
|   |   | 64 | 38 | 32 | 119% |

| | CONFIGURATION OF CACHE<br>(SIZE OF CACHE: 64 KB, CACHE LINE SIZE: 2048 bits, NUMBER OF WAYS: 1,<br>NUMBER OF BANKS: 32, NUMBER OF LOAD STORE UNITS: 16,<br>DTA: 64 bits, TGA: 36 bits, TGAC: 10 bits) | TAG ARRAY/<br>DATA ARRAY RATIO<br>[%] |
|---|---|---|
| (1) | (A) IN FIG. 16 | 36*32/64*32<br>≈56.3% |
| (2) | FIG. 1 | (36+10*31)/(64*32)<br>≈16.9%<br>⟨APPROXIMATELY<br>1/3 OF (1)⟩ |
| (3) | CONFIGURATION EXAMPLE 4 OF FIG. 12 | (36+10*15)/(64*32)<br>≈9.1%<br>⟨APPROXIMATELY<br>1/6 OF (1)⟩ |

PROCESSOR AND ARITHMETIC PROCESSING METHOD

CROSS-REFERENCE TO RELATED APPLICATIONS

This application is based upon and claims the benefit of priority of the prior Japanese Patent Application No. 2021-165561, filed on Oct. 7, 2021, the entire contents of which are incorporated herein by reference.

FIELD

Embodiments discussed herein relate to processors and processing methods. The processor may sometimes also be referred to as an arithmetic processing unit, a processing unit, or the like. The arithmetic processing method may sometimes also be simply referred to as a processing method.

BACKGROUND

A cache mounted in a processor, such as a central processing unit (CPU) or the like, holds a portion of data stored in a main memory. When the cache holds target data of a memory access request issued from an arithmetic unit and a cache hit occurs, the cache transfers the data held in the cache to the arithmetic unit without issuing the memory access request to the main memory. As a result, a data access efficiency is improved, and a processing performance of the CPU is improved.

The cache includes a data array that holds the data, and a tag array that determines whether the target data to be accessed is held in the data array, as proposed in Japanese Laid-Open Publication No. 2007-504552, for example. For example, a high-performance processor has hierarchical caches each including a plurality of ways, as proposed in Japanese Laid-Open Publication No. 2020-536303, for example. In addition, the processor may have a plurality of banks in order to improve a throughput of the cache, as proposed in Japanese Laid-Open Patent Publication No. H08-320829, for example.

For example, if the data of one cache line, that is a management unit of the cache, is divided into multiple data and held in multiple banks of the cache, the number of tag arrays increases as the number of banks increases, thereby increasing a ratio of the number of bits of the tag array with respect to the data of one cache line. Further, in the processor capable of executing a Single Instruction Multiple Data (SIMD) arithmetic instruction, the number of banks of the cache tends to increase.

SUMMARY

According to one aspect, it is one object of the present disclosure to reduce a ratio of a size of a determination unit, that determines a cache hit of the cache including the plurality of banks, with respect to a size of the cache.

According to one aspect of the embodiments, a processor includes a plurality of request issuing units each configured to issue a memory access request to a storage; a data array including a plurality of banks each configured to hold sub data divided from data read from the storage based on the memory access request; a switch configured to transfer the memory access request to one of the plurality of banks; at least one first determination unit, including a first holding unit that holds a tag address included in an access address included in the memory access request for each value of an index address in the access address, and configured to determine a cache hit indicating that an access target data is held in the data array when the tag address included in the access address matches the tag address held in the first holding unit in correspondence with the index address included in the access address; at least one second determination unit, including a second holding unit that holds identification information identifying a first tag address included in the tag address, and a second tag address included in the tag address, for each value of the index address, and configured to determine a cache hit when the identification information corresponding to the first tag address included in the access address and the second tag address included in the access address, match the identification information and the second tag address held in the second holding unit in correspondence with the index address included in the access address, respectively; and a cache controller configured to make access to the data array or the storage, based on a determination result of the first determination unit or the second determination unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram for explaining an example of a tag array/data array ratio for each configuration of the cache; and FIG. 17 is a diagram for explaining an example of effects of improving the tag array/data array ratio in a case where a tag array cache is provided.

DESCRIPTION OF EMBODIMENTS

Preferred embodiments of the present disclosure will be described with reference to the accompanying drawings.

Figure 1:
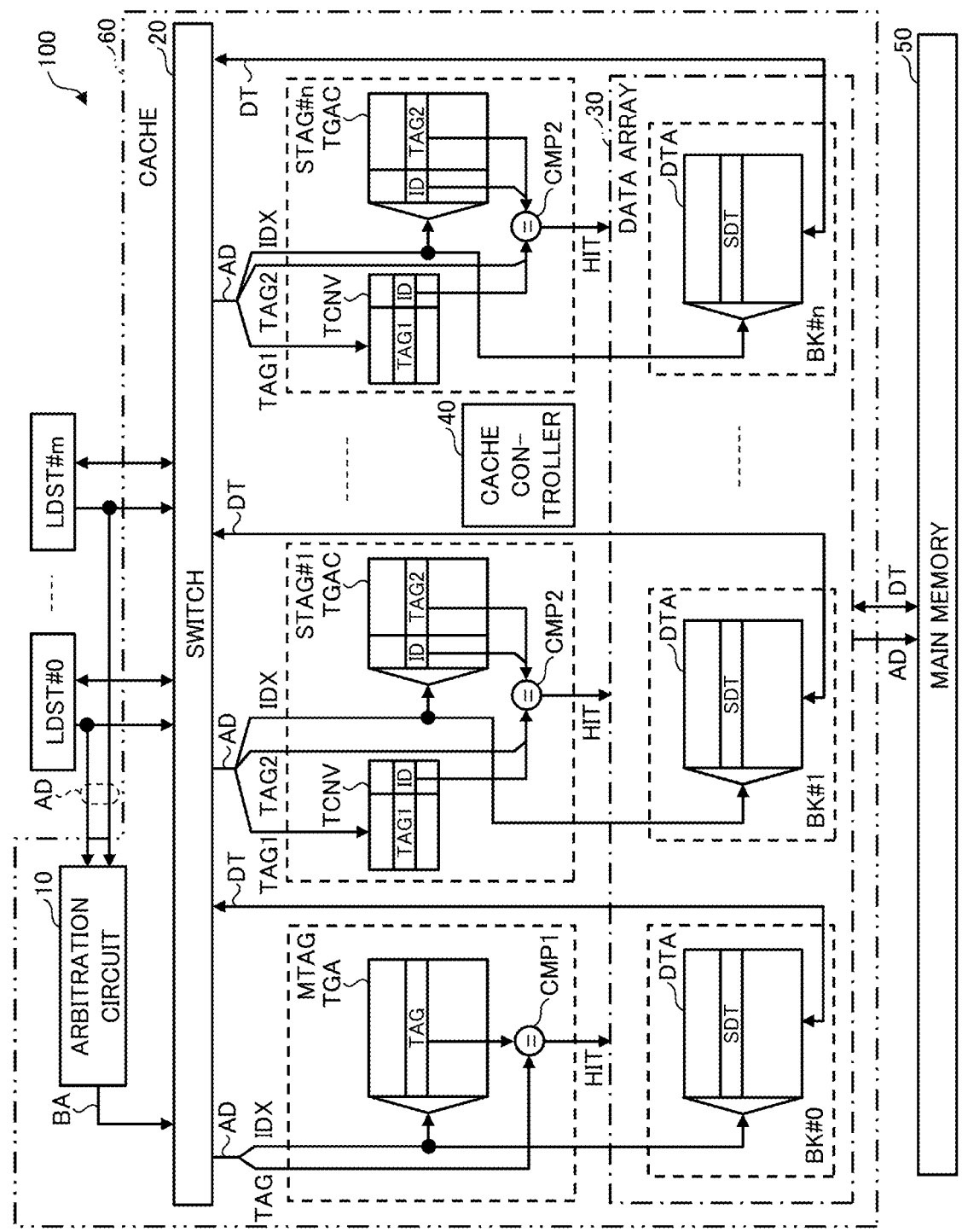
FIG. 1 is a block diagram illustrating an example of a processor according to a first embodiment.

FIG. 1 illustrates an example of a processor according to a first embodiment. A processor 100 illustrated in FIG. 1 may be a Central Processing Unit (CPU) or the like that executes an operation using a Single Instruction Multiple Data (SIMD) arithmetic instruction, for example. The processor 100 can perform a plurality of product sum operations in parallel, using the SIMD arithmetic instruction.

The processor 100 includes m+1 load store units LDST (LDST #0 through LDST #m), where m is an integer greater than or equal to 1, and a cache 60 connected to a main memory 50. The load store unit LDST is an example of a request issuing unit that issues a memory access request to the main memory 50. The main memory 50 is an example of a storage. The cache 60 operates as a Level 1 (L1) data cache that holds a portion of the data stored in the main memory 50, with respect to the load store unit LDST.

The cache 60 includes an arbitration unit 10, a switch 20, one main tag unit MTAG, n sub tag units STAG (STAG #0 through STAG#n), where n is an integer greater than or equal to 1, a data array 30, and a cache controller 40. The cache controller 40 controls an entire operation of the cache 60. The cache controller 40 may be disposed outside the cache 60. The main tag unit MTAG is an example of a first determination unit, and the sub tag units STAG are an example of a second determination unit.

The data array 30 includes n+1 banks BK (BK#0 through BK#n) corresponding to each of the main tag unit MTAG and the sub tag units STAG. By dividing the data array 30 into a plurality of banks BK, it is possible to improve the so-called gather/scatter performance.

In addition, the cache 60 may be connected to the main memory 50 via a lower level cache, such as a Level 2 (L2) cache or the like. The cache 60 may include a minimum of two banks BK#0 and BK#1. In this case, the cache 60 includes one main tag unit MTAG, and one sub tag unit STAG.

The processor 100 includes an instruction fetch unit, an instruction decoder, a reservation station, an arithmetic unit including various computing elements, a register file, or the like that are not illustrated. FIG. 1 illustrates blocks, or constituent elements, that are mainly related to a memory access. For example, the instruction fetch unit, the instruction decoder, the reservation station, the arithmetic unit, including the various computing elements, the register file, and the load store units LDST are included in a CPU core that is not illustrated.

When executing a load instruction, the load store unit LDST outputs the memory access request to the bank BK indicated by an address AD, via the switch 20, and receives read data from the bank BK, via the switch 20. The address AD includes a tag address TAG, an index address IDX, an offset address, and a bank address BA. The address AD is an example of an access address included in the memory access request. The memory access request, issued in correspondence with the load instruction, includes the address AD of an access target, and read control information indicating a read request.

When executing a store instruction, the load store unit LDST outputs the memory access request to the bank BK indicated by the address AD, via the switch 20. The memory access request, issued in correspondence with the store instruction, includes the address AD of the access target, write data, and write control information indicating a write request.

The m+1 load store units LDST receive the load instruction or the store instruction, independently of each other, and output the memory access request, independently of each other. For this reason, a contention of memory access requests may occur with respect to one bank BK. When the contention of the memory access requests occurs, the arbitration unit 10 selects one of the memory access requests. In this embodiment and embodiments that will be described later, an example will be described in which the load store unit LDST that executes the load instruction issues the memory access request (read request).

The switch 20 outputs the memory access request to the bank BK indicated by the bank address BA included in the memory access request. The switch 20 receives read data DT from the bank BK that outputs the memory access request with respect to the load instruction, and outputs the received read data DT to the load store unit LDST that is an originator or issue source of the memory access request.

The main tag unit MTAG includes a tag array TGA, and a comparator CMP1. The tag array TGA is an example of a first holding unit. The tag array TGA includes a plurality of entries for holding the tag address TAG for each value of the index address IDX. For example, in a case where the index address IDX has 10 bits, the tag array TGA includes 1024 entries. The tag array TGA outputs the tag address TAG, stored in the entry corresponding to the index address IDX received from the switch 20, to the comparator CMP1.

The comparator CMP1 compares the tag address TAG output from the tag array TGA, and the tag address TAG output from the switch 20. The comparator CMP1 outputs a hit signal HIT having an active level (cache hit) when the two tag addresses TAG that are compared match, and outputs a hit signal HIT having an inactive level (cache miss) when the two tag addresses TAG that are compared do not match.

The cache hit indicates that the access target data of the memory access request is held in the bank BK that is the access target of the data array 30. The cache miss indicates that the access target data of the memory access request is not held in the bank BK that is the access target of the data array 30. In this case, the cache 60 reads the data, that is the access target data, from the main memory 50.

The sub tag unit STAG includes a tag conversion unit TCNV, a tag array cache TGAC, and a comparator CMP2. The tag conversion unit TCNV is an example of a third holding unit, and the tag array cache TGAC is an example of a second holding unit. The tag conversion unit TCNV includes a plurality of entries identifiable by identification information ID. For example, in a case where the identification information ID has 2 bits, the tag conversion unit TCNV includes 4 entries. The number of entries of the tag conversion unit TCNV is smaller than the number of entries of the tag array cache TGAC.

Each entry of the tag conversion unit TCNV stores a first tag address TAG1, that is portion of the bits of the tag address TAG. In a case where one of the entries of the tag conversion unit TCNV stores the first tag address TAG1 included in the memory access request, the tag conversion unit TCNV outputs the identification information ID of the entry to the comparator CMP2. Accordingly, the tag conversion unit TCNV functions as a Content Addressable Memory (CAM) that outputs the identification information ID indicating the entry that holds the received first tag address TAG1. An element other than the tag conversion unit TCNV may be provided in the sub tag unit STAG, if the correspondence can be achieved between the first tag address TAG1 and the identification information ID for identifying the first tag address TAG1.

The tag array cache TGAC includes a plurality of entries for holding the identification information ID and the second tag address TAG2, for each value of the index address IDX. The second tag address TAG2 is indicated by bits of the tag address TAG that are different from the bits of the first tag address TAG1. For example, the tag address TAG is formed by connecting the bits of the first tag address TAG1 and the bits of the second tag address TAG2. The tag array cache TGAC outputs the identification information ID and the second tag address TAG2, held in the entry corresponding to the index address IDX output from the switch 20, to the comparator CMP2.

The comparator CMP2 compares the identification information ID output from the tag conversion unit TCNV, and the identification information ID output from the tag array cache TGAC. In addition, the comparator CMP2 compares the second tag address TAG2 output from the switch 20, and the second tag address TAG2 output from the tag array cache TGAC.

The comparator CMP2 outputs a hit signal HIT having an active level (cache hit) when the two identification information ID that are compared match and the two second tag addresses TAG2 that are compared also match. The comparator CMP2 outputs a hit signal HIT having an inactive level (cache miss) when the two identification information ID that are compared do not match and the two second tag addresses TAG2 that are compared also do not match, or the two identification information ID that are compared do not match, or the two second tag addresses TAG2 that are compared do not match.

The cache hit of the sub tag unit STAG indicates that the access target data of the memory access request is held in the bank BK that is the access target of the data array 30, similar to the cache hit of the main tag unit MTAG. The cache miss of the sub tag unit STAG indicates that the access target data of the memory access request is not held in the bank BK that is the access target of the data array 30, similar to the cache miss of the main tag unit MTAG.

For example, the tag address TAG has 36 bits, the first tag address TAG1 has 28 bits, the second tag address TAG2 has 8 bits, the identification information ID has 2 bits, and the index address IDX has 10 bits in one example. In this case, a storage area of the tag array cache TGAC can be reduced by approximately 26 kilobits compared to a storage area of the tag array TGA ((28−2)*1024, where a symbol "*" denotes a multiplication). A storage area of the tag conversion unit TCNV is 120 bits ((28+2)*4).

The comparator CMP1 compares the 36-bit tag addresses TAG, while the comparator CMP2 compares the 10-bit combinations of the 2-bit identification information ID and the 8-bit second tag address TAG2. For this reason, a circuit scale of the sub tag unit STAG becomes smaller than a circuit scale of the main tag unit MTAG. Accordingly, the processor 100 can reduce a scale of a determination circuit for determining the cache hit, compared to a case where the main tag unit MTAG is provided for each bank BK. As a result, compared to the processor in which the main tag unit MTAG is provided for each bank BK, it is possible to reduce a manufacturing cost or the like of the processor 100.

Each bank BK includes a plurality of entries for holding sub data SDT for each value of the index address IDX. The sub data SDT has a size obtained by dividing a cache line size by the number of banks BK. The size of the sub data SDT will be described later in conjunction with FIG. 2 and FIG. 3.

When the cache hit occurs, each bank BK outputs the sub data SDT held in an entry corresponding to the index address IDX included in the memory access request, to the switch 20, based on control of the cache controller 40. On the other hand, when the cache miss occurs, each bank BK holds sub data SDT corresponding to the index address IDX included in the memory access request, among data DT of one cache line read from the main memory 50, in an entry corresponding to the index address IDX, based on the control of the cache controller 40.

The cache controller 40 receives the hit signal HIT from the main tag unit MTAG and the sub tag unit STAG, and controls the cache 60 as described above. The cache controller 40 performs a data transfer between the bank BK and the main memory 50. In addition, in a case where the sub data held in each bank BK is updated, the cache controller 40 writes back the sub data to the main memory 50 when the cache miss occurs.

The cache 60 illustrated in FIG. 1 is a direct mapping cache, but a set associative cache having a plurality of ways may be used for the cache 60. In this case, the tag array TGA and the tag array cache TGAC are also partitioned into a number corresponding to the number of ways. The cache 60 illustrated in each of the embodiments described below is also a direct mapping cache, but the set associative cache may be used for the cache 60 in each of the embodiments described below.

Figure 2:
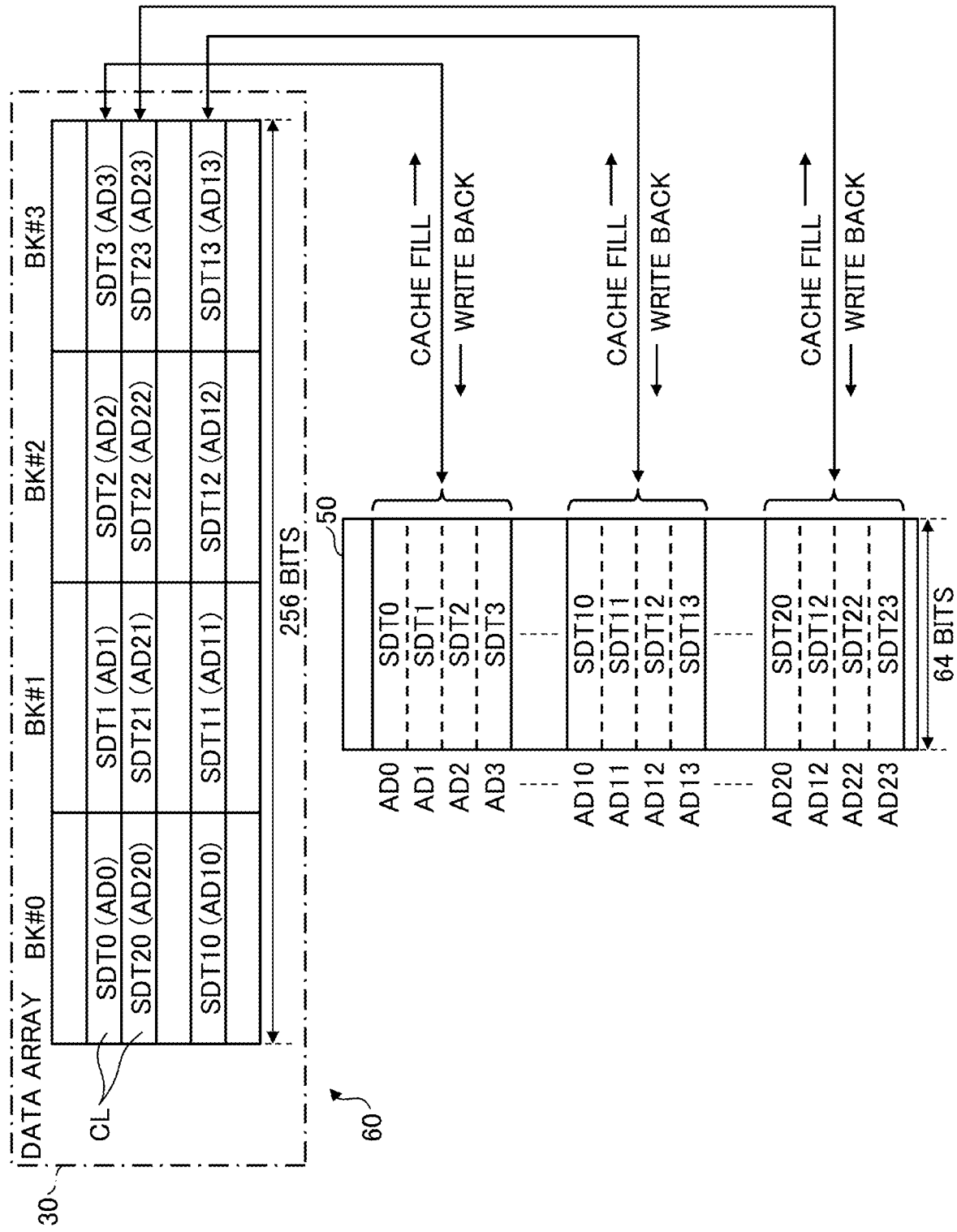
FIG. 2 is a diagram for explaining an example of data held in a cache illustrated in FIG. 1.
Figure 3:
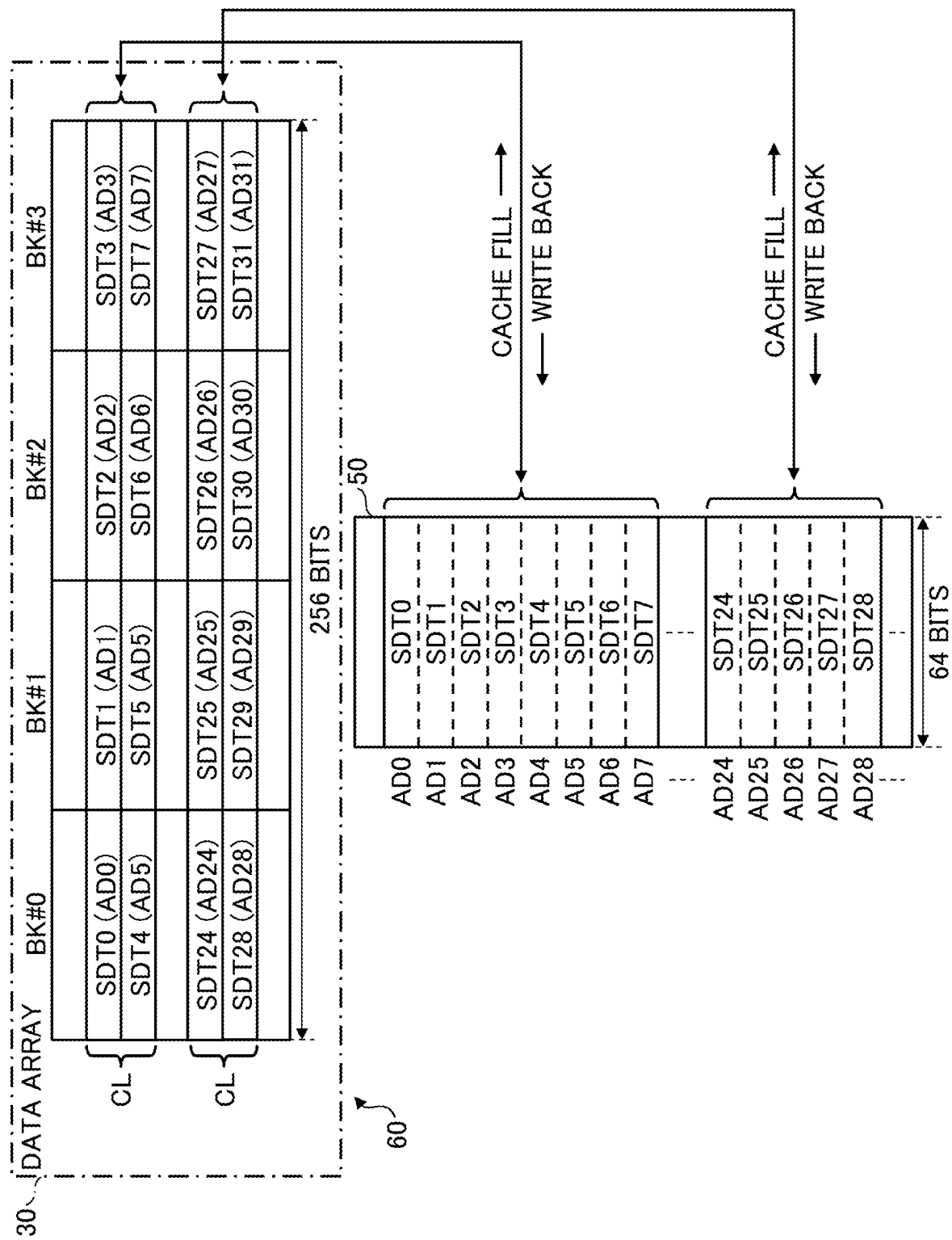
FIG. 3 is a diagram for explaining another example of the data held in the cache illustrated in FIG. 1.

FIG. 2 and FIG. 3 illustrate examples of the data held in the cache 60 illustrated in FIG. 1. In FIG. 2 and FIG. 3, the processor 100 includes four banks BK #0 through BK #3. Each of the banks BK #0 through BK #3 holds a 64-bit sub data SDT for each entry identified by the index address IDX.

In the four banks BK #0 through BK #3 illustrated in FIG. 2, four sub data SDT included in one entry identified by the index address IDX correspond to one cache line CL. In the example illustrated in FIG. 2, a data size of the cache line CL is 256 bits. In this case, the cache controller 40 illustrated in FIG. 1 performs a cache fill that transfers the data from the main memory 50 to the cache 60. During the cache fill, the sub data SDT included in the cache line CL are stored in the entries of the banks BK #0 through BK #3 identified by a common index address IDX, in an order according to the address AD. In addition, the cache controller 40 performs a write back that transfers the data from the cache 60 to the main memory 50. During the write back, the four sub data SDT held in the entries of the banks BK #0 through BK #3 identified by the common index address IDX, are stored in the main memory 50 in an order according to the address.

In the four banks BK #0 through BK #3 illustrated in FIG. 3, eight sub data SDT included in two entries identified by two consecutive index addresses IDX correspond to one cache line CL. In the example illustrated in FIG. 3, the data size of the cache line CL is 512 bits. In this case, the cache controller 40 performs the cache fill. During the cache fill, the sub data SDT included in the two cache lines CL are stored in the two entries of the banks BK #0 through BK #3 identified by two consecutive index addresses IDX, in an order according to the address AD. In addition, during the write back, the cache controller 40 stores eight sub data SDT held in two entries of the banks BK #0 through BK #3 identified by two consecutive index addresses IDX, in the main memory 50 in an order according to the address.

For example, in a case where the cache 60 includes four banks BK having a bit width of 64 bits, and the size of the cache line CL is 1024 bits, the cache controller 40 performs the cache fill and write back with respect to four entries of each of the four banks BK. In a case where the cache 60 includes eight banks BK having the bit width of 64 bits, and the size of the cache line CL is 1024 bits, the cache controller 40 performs the cache fill and the write back with respect to two entries of each of the eight banks BK.

Figure 4:
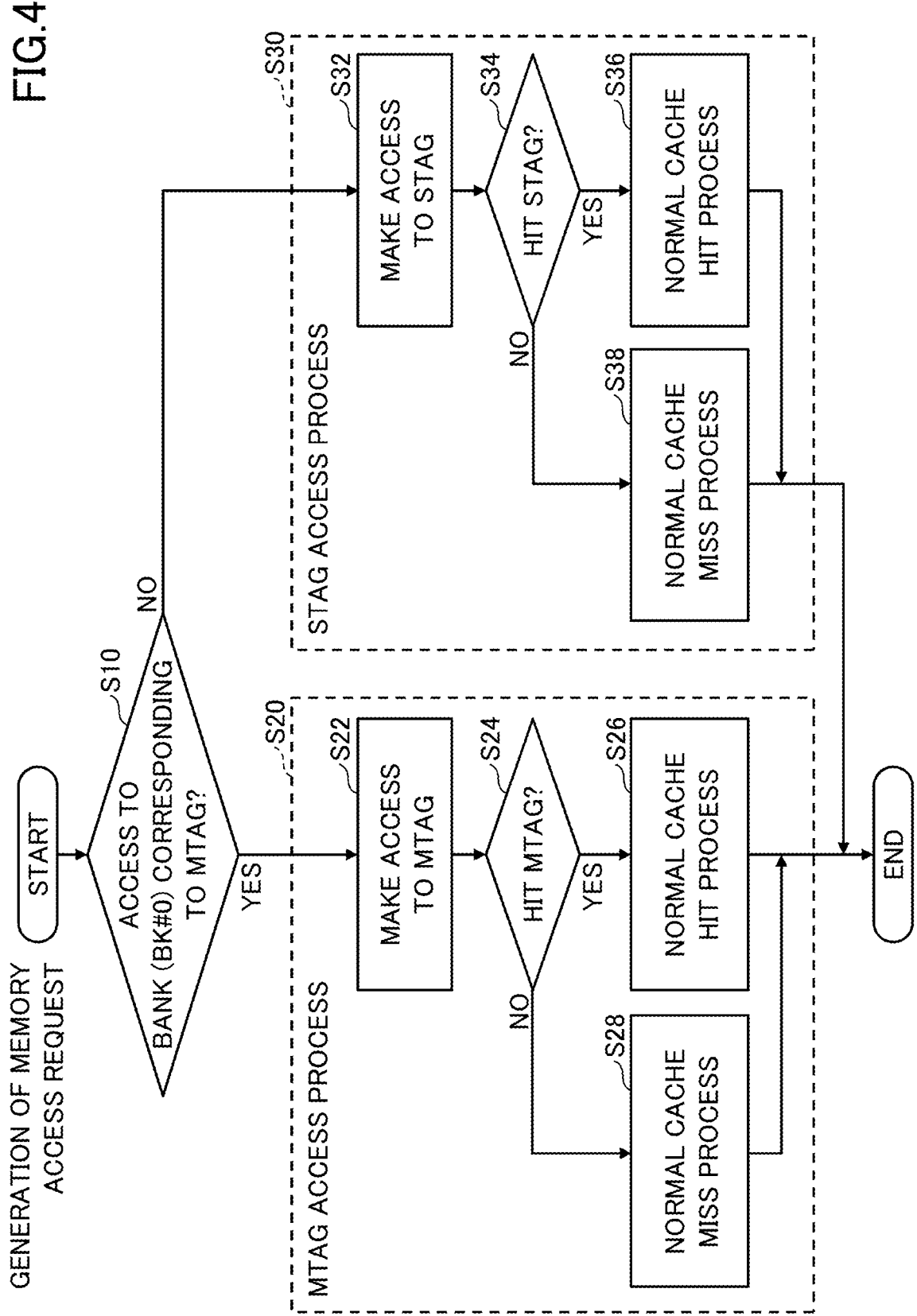
FIG. 4 is a flow chart illustrating an example of a memory access operation of the processor illustrated in FIG. 1.

FIG. 4 illustrates an example of a memory access operation of the processor 100 illustrated in FIG. 1. That is, FIG. 4 illustrates an example of an arithmetic processing method of the processor 100. The operation illustrated in FIG. 4 is performed by the cache controller 40, based on issuance of a memory access request corresponding to a load instruction from at least one of the plurality of load store units LDST.

When a cache hit of the memory access requests with respect to mutually different banks BK from the plurality of load store units LDST occurs, the operation illustrated in FIG. 4 is performed in each of the banks BK that are access targets. When a cache miss of one of the memory access requests with respect to the mutually different banks BK from the plurality of load store units LDST occurs, the write back associated with the cache miss, and cache fill after the write back, are performed in common in all of the banks BK.

First, in step S10, the cache controller 40 determines whether or not the memory access request indicates the bank BK (BK #0 in this example) corresponding to the main tag unit MTAG, using the bank address BA. When the memory access request indicates the bank BK corresponding to the main tag unit MTAG, the operation of the cache controller 40 advances to step S20. The cache controller 40 performs an access process using the main tag unit MTAG, in steps S22, S24, S26, and S23 included in step S20.

When the memory access request does not indicate the bank BK corresponding to the main tag unit MTAG, the operation of the cache controller 40 advances to step S30. The cache controller 40 performs an access process using the sub tag unit STAG, in steps S32, S34, S36, and S38 included in step S30.

In step S22, the cache controller 40 makes access to the main tag unit MTAG based on the index address IDX included in the memory access request, and reads the tag address TAG. In addition, the cache controller 40 causes a comparator CMP1 to compare the tag address TAG included in the memory access request and the tag address TAG read from the main tag unit MTAG, and to output the hit signal HIT.

Next, in step S24, the cache controller 40 determines whether or not a cache hit occurred in the main tag unit MTAG based on the hit signal HIT output from the comparator CMP1. The operation of the cache controller 40 advances to step S26 when the hit occurs in the main tag unit MTAG, and the operation of the cache controller 40 advances to step S28 when a cache miss occurs in the main tag unit MTAG.

In step S26, the cache controller 40 performs a normal cache hit process, and outputs the data read from the bank BK in which the cache hit occurred to the load store unit LDST that is the originator of the memory access request, via the switch 20. Then, the cache controller 40 ends the operation illustrated in FIG. 4.

In step S28, the cache controller 40 performs a normal cache miss processing. That is, the cache controller 40 performs the cache fill operation illustrated in FIG. 2 or FIG. 3, for example, and updates the data held in each bank BK. Further, the cache controller 40 updates the main tag unit MTAG, the tag conversion unit TCNV, and the tag array cache TGAC according to the update of the data in each bank BK. The cache controller 40 performs a write back operation when the data in the bank BK is updated. Then, the cache controller 40 ends the operation illustrated in FIG. 4.

On the other hand, in step S32, the cache controller 40 makes access to the sub tag unit STAG corresponding to the bank BK indicated by the bank address BA included in the memory access request. The cache controller 40 makes access to the tag conversion unit TCNV based on the tag address TAG1 included in the memory access request, and reads the identification information ID. The cache controller 40 makes access to the tag array cache TGAC based on the index address IDX included in the memory access request, and reads the identification information ID and the tag address TAG2.

Then, the cache controller 40 causes a comparator CMP2 to compare the tag address TAG2 included in the memory access request and the tag address TAG2 read from the tag array cache TGAC. In addition, the cache controller 40 the comparator CMP2 to compare the identification information ID read from the tag conversion unit TCNV and the identification information ID read from the tag array cache TGAC. The cache controller 40 outputs the hit signal HIT based on a comparison result of the comparator CMP2.

Next, in step S34, the cache controller 40 determines whether or not a cache hit occurred in the sub tag unit STAG based on the hit signal HIT output from the comparator CMP2. When the hit occurs in the sub tag unit STAG, the operation of the cache controller 40 advances to step S36. When a cache miss occurs in the sub tag unit STAG, the operation of the cache controller 40 advances to step S38.

In step S36, the cache controller 40 performs the normal cache hit process in a manner similar to step S26, and ends the operation illustrated in FIG. 4. In step S38, the cache controller 40 performs the normal cache miss process similar to step S28, and ends the operation illustrated in FIG. 4.

As described above, in this embodiment, the processor 100 can determine whether or not the cache hit occurred in the bank BK, by the tag array cache TGAC that holds the identification information ID identifying the first tag address TAG1, and the second tag address TAG2. The bit width of the entry of the tag array cache TGAC is smaller than the bit width of the entry of the tag array TGA. As described above, the circuit scale of the sub tag unit STAG including the tag conversion unit TCNV and the tag array cache TGAC is smaller than the circuit scale of the main tag unit MTAG including the tag array TGA.

For this reason, the processor 100 can determine whether or not the cache hit occurred in the banks BK #1 through BK #n, using the sub tag unit STAG having the circuit scale smaller than the circuit scale of the main tag unit MTAG. In other words, compared to the case where the main tag unit MTAG is provided for each bank BK, the processor 100 can reduce the scale of the determination circuit that determines whether or not the cache hit occurred. As a result, compared to the processor in which the main tag unit MTAG is provided for each bank BK, it is possible to reduce the manufacturing cost or the like of the processor 100.

Figure 5:
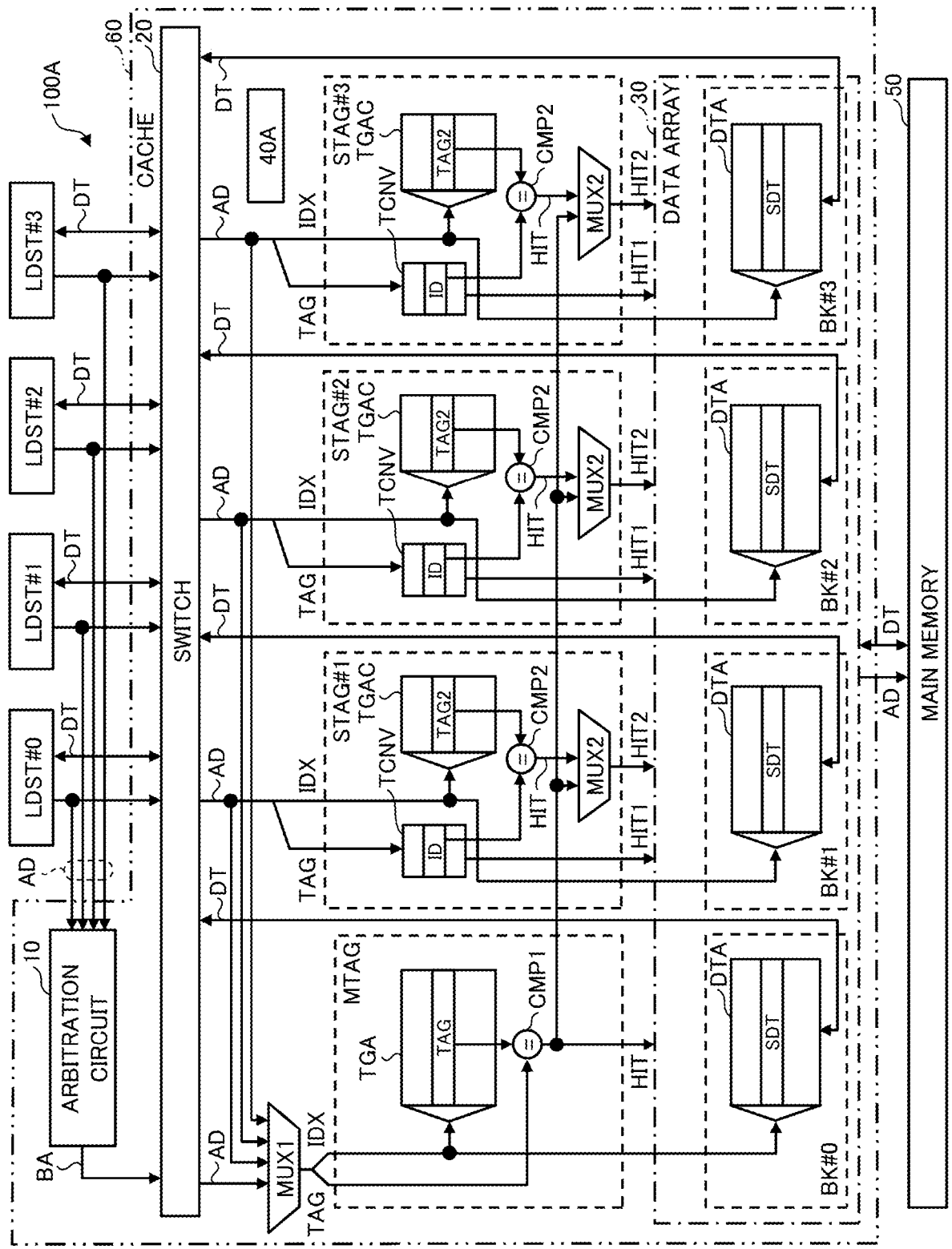
FIG. 5 is a block diagram illustrating an example of the processor according to a second embodiment.

In this embodiment, the main tag unit MTAG or the sub tag unit STAG, corresponding to each bank BK, is provided on the side of the switch 20 closer to the bank BK. The switch 20 determines the bank BK that is the access target, based on the access address output from the load store unit LDST, and outputs the access address to the main tag unit MTAG or the sub tag unit STAG corresponding to the determined bank BK. For this reason, the hit signal HIT output from the main tag unit MTAG or the sub tag unit STAG includes the information of the bank BK. Accordingly, the cache controller 40 can control the bank BK according to the hit signal HIT from the main tag unit MTAG and the sub tag unit STAG, without using the bank address BA FIG. 5 illustrates an example of the processor according to a second embodiment. In this embodiment, constituent elements that are the same as the constituent elements of the first embodiment described above are designated by the same reference numerals, a detailed description thereof will be omitted. A processor 100A illustrated in FIG. 5 is a CFU or the like having a function to perform a plurality of product sum operations in parallel, using the SIMD arithmetic instruction, for example.

The processor 100A has a configuration similar to the configuration of the processor 100 illustrated in FIG. 1, except that the processor 100A includes a multiplexer MUX1, and a cache controller 40A is provided in place of the cache controller 40 illustrated in FIG. 1. In order to simplify the description, it is assumed that the processor 100A includes four load store unit LDST (LDST #0 through LDST #3), three sub tag units STAG (STAG #1 through STAG #3), and four banks BK (BK #0 through BK #3). In this embodiment, an example in which the load instruction is issued from the load store unit LDST is also described.

The main tag unit MTAG is provided in correspondence with the bank BK #0. The sub tag units STAG #1 through STAG #3 are provided in correspondence with the banks BK #1 through BK #3, respectively. The multiplexer MUX1 receives the address AD for the main tag unit MTAG and the address AD for the sub tag unit STAG that are output from the switch 20, and outputs one of the received addresses AD to the main tag unit MTAG.

The configuration of the sub tag unit STAG is similar to the configuration of the sub tag unit STAG illustrated in FIG. 1, except that the tag conversion unit TCNV outputs the hit signal HIT1, a multiplexer MUX2 is provided. The multiplexer MUX2 of each sub tag unit STAG outputs one of a hit signal HIT2 output from the comparator CMP2 and the hit signal HIT output from the comparator CMP1 of the main tag unit MTAG. Operations of the multiplexers MUX1 and MUX2 are controlled by the cache controller 40A.

The cache controller 40A determines whether or not a provisional cache miss occurred, when a hit signal HIT1 having an inactive level is received from one of the tag conversion units TCNV. The provisional cache miss is a cache miss determined by the tag conversion unit TCNV of the sub tag unit STAG, and there is a possibility of a cache hit.

Further, the cache controller 40A controls the multiplexer MUX1, and causes the multiplexer MUX1 to output the address AD, that is supplied to the sub tag unit STAG in which a provisional cache miss occurred, to the main tag unit MTAG. Accordingly, the cache controller 40A can determine whether the cache hit or the cache miss occurred in the bank BK corresponding to the sub tag unit STAG in which the provisional cache miss occurred, using the tag array TGA of the main tag unit MTAG.

The cache controller 40A causes the multiplexer MUX2 of the sub tag unit STAG in which the provisional cache miss occurred, to select the hit signal HIT output from the tag array TGA of the tag conversion unit TCNV, and to output this hit signal HIT as the hit signal HIT2. Accordingly, the cache controller 40A can determine whether a true cache hit or a true cache miss occurred in the bank BK corresponding to the sub tag unit STAG in which the provisional cache miss occurred, using a determination result of the tag array TGA. Further, the cache controller 40A can control the operation of the cache 60 according to the determination result. When the tag conversion unit TCNV outputs the hit signal HIT1 having an inactive level, the hit signal HIT output from the comparator CMP2 always indicates the inactive level.

Figure 6:
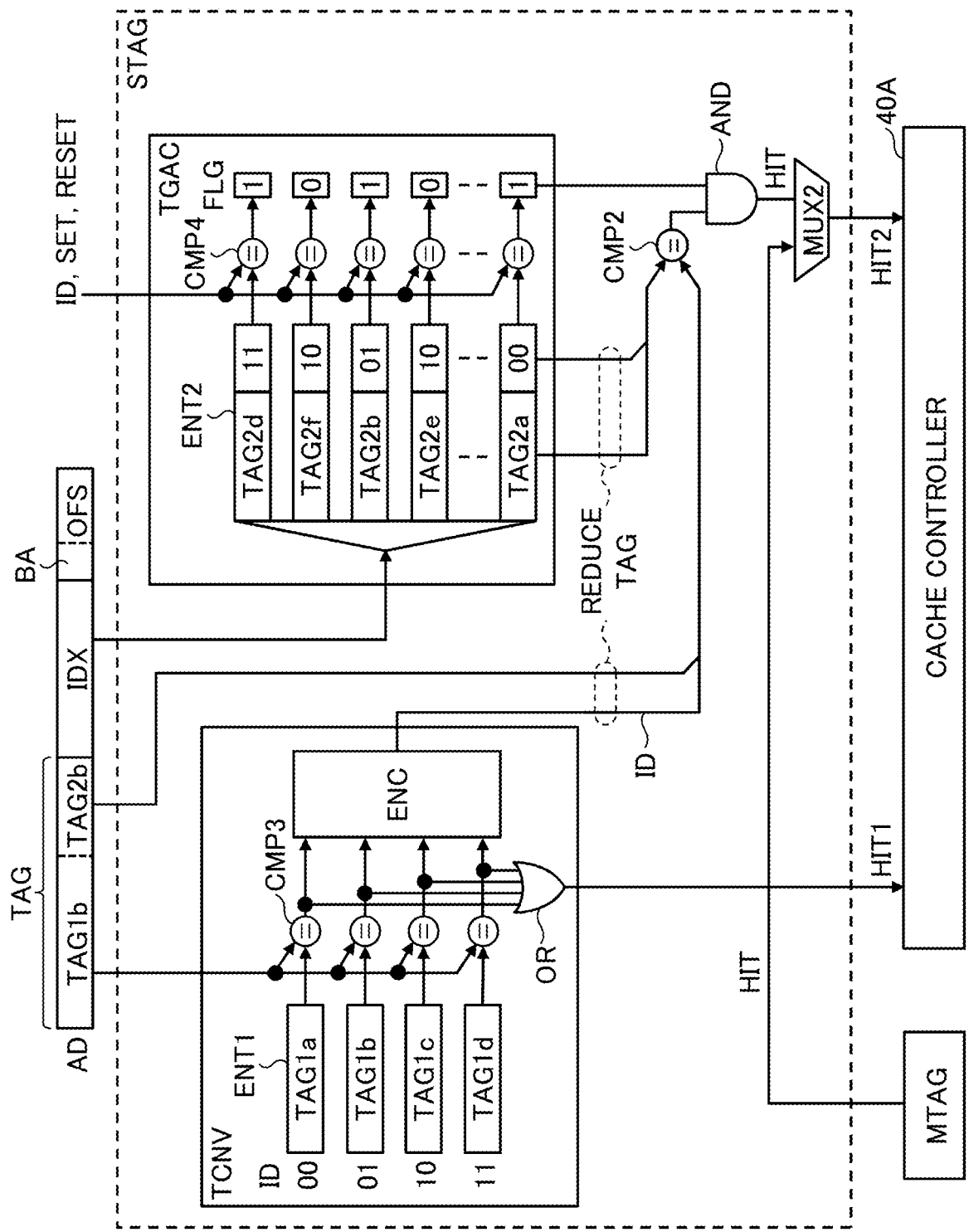
FIG. 6 is a block diagram illustrating an example of a sub tag unit illustrated in FIG. 5.

FIG. 6 illustrates an example of the sub tag unit STAG illustrated in FIG. 5. The address AD output from the switch 20 illustrated in FIG. 5 includes the tag address TAG including the first tag address TAG1 and the second tag address TAG2, the index address IDX, and an offset address OFS. The offset address OFS includes the bank address BA (for example, 2 bits) that identifies the bank BK. The first tag address TAG1 and the second tag address TAG2 are appended with one of the symbols "a" through "f" that are used for describing the operation.

For example, the tag conversion unit TCNV includes four entries ENT1 identified by the identification information ID, comparators CMP3 corresponding to the entries ENT1, respectively, an OR circuit OR, and an encoder ENC. The first tag address TAG1 is stored in each entry ENT1 by the cache controller 40A that determines the occurrence of the cache miss.

Each comparator CMP 3 compares the first tag address TAG1 stored in the corresponding entry ENT1 and the first tag address TAG1 included in the memory access request, and outputs a comparison result to the OR circuit OR and the encoder ENC. For example, each comparator CMP3 outputs a logic (that is, logic value or logic level) "1" when the two compared first tag addresses TAG1 match.

The OR circuit OR sets the hit signal HIT1 to the active level when one of the outputs of the comparators CMP3 has the logic "1", and sets the hit signal HIT1 to the active level when all the outputs of the comparators CMP3 have a logic "0".

The encoder EMC outputs the identification information ID of the entry ENT1 corresponding to the comparator CMP3 that outputs the logic "1". In other words, the encoder ENC outputs the identification information ID of the entry ENT1 that holds the first tag address TAG1 included in the memory access request. As described above, the tag conversion unit TCNV operates as a CAM. The identification information ID output from the encoder ENC, and the second tag address TAG2 included in the memory access request, are output to the comparator CMP2 as a reduced tag obtained by encoding the first tag address TAG1.

The tag array cache TGAC includes a plurality of entries ENT2 that hold the second tag address TAG2 and the identification information ID for each value of the index address IDX, comparators CMP4 corresponding to the entries ENT2, respectively, and flags FLG corresponding to the entries ENT2, respectively. Each flag FLG, in an initial state, is reset to the logic "0" indicating that the corresponding entry ENT2 is invalid. Each flag FLG is set or reset by the cache controller 40A. The set state (logic "1") of each flag FLG indicates that the corresponding entry ENT2 holds a valid second tag address TAG2 and a valid identification information ID. The reset state (logic "0") of each flag FLG indicates that the corresponding entry ENT2 holds an invalid second tag address TAG2 or an invalid identification information ID.

When the identification information ID held in the entry ENT2 matches the identification information ID that is output from the cache controller 40A together with a set signal SET, each comparator CMP4 sets the corresponding flag FLG to the logic "1". When the identification information ID held in the entry ENT2 matches the identification information ID that is output from the cache controller 40A together with a reset signal RESET, each comparator CMP4 resets the corresponding flag FLG to the logic "0".

By providing the flag FLG with respect to each entry ENT2 of the tag array cache TGAC, the cache controller 40A can invalidate the entry ENT2 by simply resetting the flag FLG, without having to rewrite the second tag address TAG2 or the identification information ID. Accordingly, it is possible to reduce an erroneous hit signal HIT2 from being output to the cache controller 40A, using a simple control.

The cache controller 40A updates each of the banks BK #0 through BK #3 using the sub data SDT (cache line) read from the main memory 50 illustrated in FIG. 5, based on the cache miss. The cache controller 40A updates the tag array TGA of the main tag unit MTAG illustrated in FIG. 5, in correspondence with the update of each of the banks BK #0 through BK #3, and updates the tag conversion unit TCNV and the tag array cache TGAC. Because the operation of the tag array TGA when the cache miss occurs is the same as the normal cache miss process, the update process of the sub tag unit STAG will be described below.

During the update process, the cache controller 40A stores the first tag address TAG1 included in the memory access request in one of the entries ENT1. The cache controller 40A outputs the identification information ID of the entry ENT1 that stores the first tag address TAG1, and the reset signal RESET signal, to the comparator CMP4. The cache controller 40A resets the flag FLG corresponding to the entry ENT2 that holds the identification information ID output to the comparator CMP4.

The cache controller 40A stores the second tag address TAG2 included in the memory access request in the entry ENT2 corresponding to the index address IDX included in the memory access request. In addition, the cache controller 40A stores the identification information ID of the entry ENT1 that stores the first tag address TAG1 in the entry ENT2 that stores the second tag address TAG2. Further, the cache controller 40A outputs the identification information ID of the entry ENT1 that stores the first tag address TAG1, and the set signal SET, to the comparator CMP4. The cache controller 40A sets the flag FLG corresponding to the entry ENT2 that holds the identification information ID output to the comparator CMP4.

As illustrated in FIG. 6, it is assumed that first tag addresses TAG1$a$, TAG1$b$, TAG1$c$, and TAG1$d$ are held in the four entries ENT1 of the tag conversion unit TCNV of one of the sub tag units STAG. It is also assumed that second tag addresses TAG2$d$, TAG2$f$, TAG2$b$, TAG2$e$, ..., TAG2$a$ are held in the entries ENT2 of the tag array cache TGAC.

In this state, the sub tag unit STAG receives a memory access request including the first tag address TAG1$b$ and the second tag address TAG2$b$, for example. It is assumed that the second tag address TAG2$b$, and the identification information ID="01", are held in the entry ENT2 corresponding to the index address IDX included in the memory access request, and that the corresponding flag FLG is has the logic "1".

Because the identification information ID of the entry ENT1 holding the first tag address TAG1$b$ included in the memory access request is "01", the tag conversion unit TCNV sets the hit signal HIT1 to the active level, and outputs the identification information ID="01" from the encoder ENC. The reduced tag received by the comparator CMP2 from the tag conversion unit TCNV includes the identification information ID="01", and the second tag address TAG2$b$.

The tag array cache TGAC outputs the second tag address TAG2$b$ and the identification information ID="01" held in the entry ENT2 corresponding to the index address IDX included in the memory access request, as a reduced tag. In addition, the tag array cache TGAC outputs the logic "1" held in the flag FLG corresponding to the index address IDX included in the memory access request.

The comparator CMP2 outputs a logic "1" to the AND circuit AND, because the two compared reduced tags match. The AND circuit AND receives the logic "1" from the comparator CMP2, and the logic "1" from the flag FLG, and sets the hit signal HIT to the active level. The cache controller 40A causes the multiplexer MUX2 to select the output of the AND circuit AND when the memory access request is issued. For this reason, the multiplexer MUX2 outputs the hit signal HIT having the active level to the cache controller 40A, as the hit signal HIT2. The cache controller 40A detects the cache hit in the bank BK corresponding to the sub tag unit STAG based on the hit signal HIT2 having the active level, and outputs the sub data SDT held in the bank BK to the load store unit LDST.

On the other hand, although the first tag address TAG1 included in the memory access request is held in the entry ENT1, there are cases where the reduced tag corresponding to the tag conversion unit TCNV does not match the reduced tag output from the entry ENT2. Alternatively, the two compared reduced tags may match, but there are cases where the flag FLG is reset to the logic "0". In these cases, the cache controller 40A receives the hit signal HIT2 having the inactive level, and performs the cache miss process. Further, the cache controller 40A performs the update process of each bank BK, and the update process of the tag array cache TGAC and the tag conversion unit TCNV.

Moreover, when the first tag address TAG1 included in the memory access request is not held in the entry ENT1, the tag conversion unit TCNV sets the hit signal HIT1 to the inactive level (logic "0") as described above, when the cache controller 40A receives the hit signal HIT1 having the inactive level, the cache controller 40A detects a provisional cache miss, and causes the multiplexer MUX1 illustrated in FIG. 5 to select the address AD supplied to the sub tag unit STAG. In addition, the cache controller 40A causes the multiplexer MUX2 to select the hit signal HIT from the main tag unit MTAG.

The main tag unit MTAG receives the address AD that generated the provisional cache miss, via the multiplexer MUX1, determines whether the cache hit or the cache miss occurred, using the tag array TGA, and outputs the hit signal HIT. The cache controller 40A receives the hit signal HIT output from the main tag unit MTAG via the multiplexer MUX2, as the hit signal HIT2, and performs cache hit process or the cache miss process according to the hit signal HIT2.

During the cache hit process, the cache controller 40A outputs the sub data SDT held in the bank BK to the load store unit LOST. During the cache miss process, the cache controller 40A performs the update process of the data of each bank BK, and the update process of the tag array TGA, the tag conversion unit TCNV, and the tag array cache TGAC, as described above.

Figure 7:
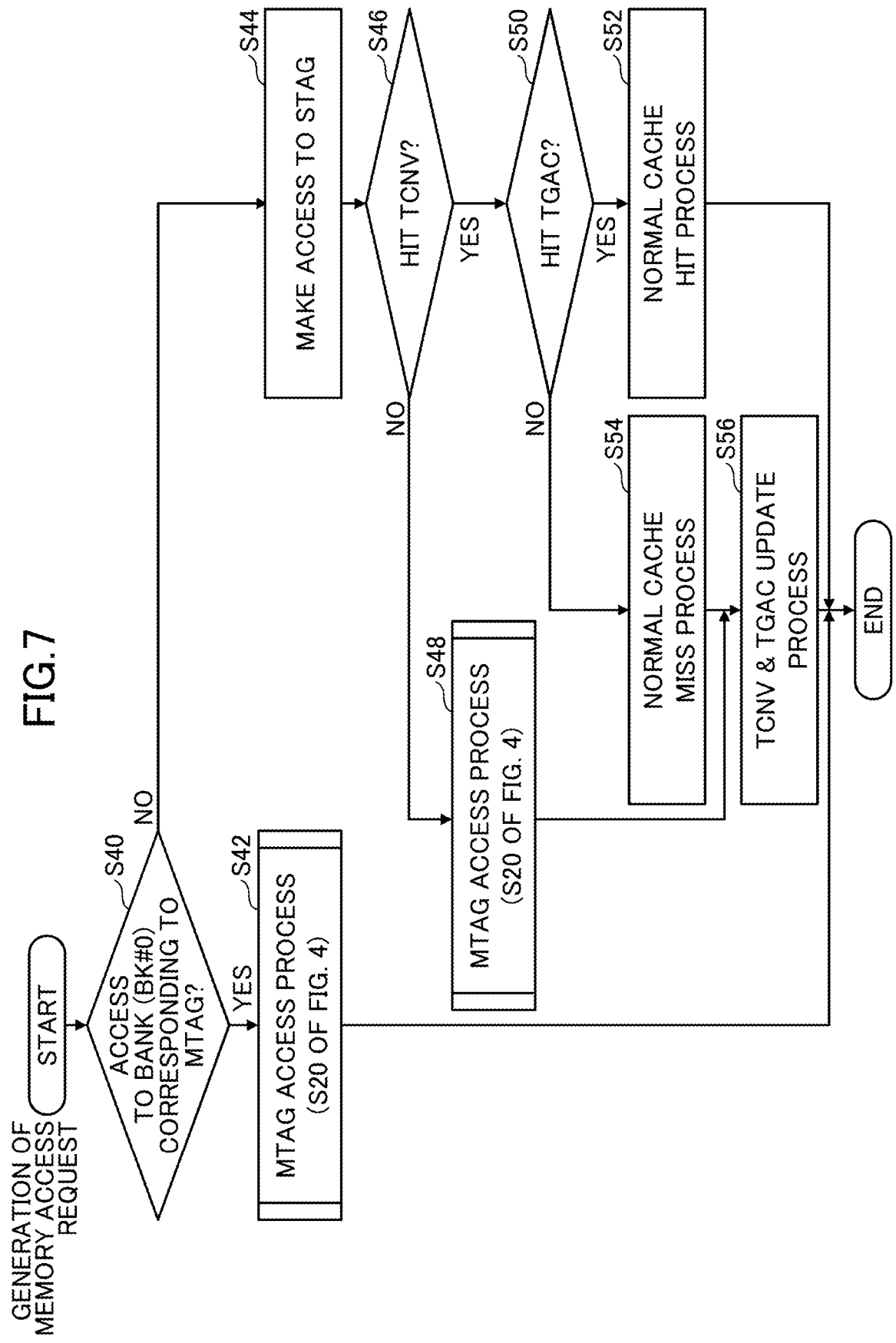
FIG. 7 is a flow chart illustrating an example of the memory access operation of the processor illustrated in FIG. 5.

FIG. 7 illustrates an example of the memory access operation of the processor 100A illustrated in FIG. 5. That is, FIG. 7 illustrates an example of the arithmetic processing method of the processor 100A. A detailed description of operations that are the same as the operations described above in conjunction with FIG. 4 and FIG. 6 will be omitted. The operation illustrated in FIG. 7 is performed by the cache controller 40A, based on issuance of a memory access request corresponding to a load instruction from at least one of the plurality of load store units LOST.

First, in step S40, the cache controller 40 determines whether or not the memory access request indicates the bank BK (BK #0 in this example) corresponding to the main tag unit MTAG, using the bank address BA. When the memory access request indicates the bank BK corresponding to the main tag unit MTAG, the operation of the cache controller 40A advances to step S42. On the other hand, when the memory access request does not indicate the bank BK corresponding to the main tag unit MTAG, the operation of the cache controller 40A advances to step S44.

The process of step S42 is similar to the access process of step S20 using the main tag unit MTAG illustrated in FIG. 4. The cache controller 40A ends the operation illustrated in FIG. 7 after performing the process of step S42.

In step S44, the cache controller 40A makes access to the sub tag unit STAG corresponding to the bank BK indicated by the bank address BA included in the memory access request, similar to step S32 illustrated in FIG. 4. In addition, the cache controller 40A causes the sub tag unit STAG to determine whether the cache hit or the cache miss occurred in the tag conversion unit TCNV, and whether the cache hit or the cache miss occurred in the tag array cache TGAC.

Next, in step S46, the cache controller 40A determines whether or not a cache hit occurred in the tag conversion unit TCNV, based on the hit signal HIT1 output from the tag conversion unit TCNV. The operation of the cache controller 40A advances to step S50 when cache hit occurs in the tag conversion unit TCNV, and the operation of the cache controller 40A advances to step S48 when the cache miss occurs in the tag conversion unit TCNV. The process of step S48 is similar to the access process of step S20 using the main tag unit MTAG illustrated in FIG. 4. After performing the process of step S43, the operation of the cache controller 40A advances to step S56.

In step S50, the cache controller 40A determines whether or not the cache hit occurred in the tag array cache TGAC. When the cache hit occurs in the tag array cache TGAC, the cache hit occurs in both the tag conversion unit TCNV and the tag array cache TGAC, and thus, the operation of the cache controller 40A advances to step S52 to perform the normal cache hit process. The process of step S52 is similar to the process of step S36 illustrated in FIG. 4.

On the other hand, when the cache miss occurs in the tag array cache TGAC, the operation of the cache controller 40A advances to step S54. The process of step S54 is similar to the process of step S38 illustrated in FIG. 4, except that the update process of the tag conversion unit TCNV and the tag array cache TGAC is not included. The cache controller 40A performs the process of step S56 after performing the process of step S54. In step S56, the cache controller 40A performs the update process of the tag conversion unit TCNV and the tag array cache TGAC, and the cache controller 40A ends the operation illustrated in FIG. 7.

As described above, in this embodiment, it is possible to obtain effects similar to the effects obtainable in the first embodiment described above. For example, the processor 100A can reduce the scale of the determination circuit that determines whether or not the cache hit occurred, compared to the case where the main tag unit MTAG is provided for each bank BK. As a result, the manufacturing cost or the like of the processor 100A can foe reduced compared to the processor in which the main tag unit MTAG is provided for each bank BK.

Further, in this embodiment, when the tag conversion unit TCNV determines that the provisional cache miss occurred, the cache controller 40A supplies the access address to the main tag unit MTAG, via the multiplexer MUX1. Accordingly, the cache controller 40A can determine whether the cache hit or the cache miss occurred in the bank BK corresponding to the provisional cache miss, using the tag array TGA of the main tag unit MTAG.

By providing the flag FLG with respect to each entry ENT2 of the tag array cache TGAC, the cache controller 40A can invalidate the entry ENT2 by simply resetting the flag FLG, without having to rewrite the second tag address TAG2 or the identification information ID. Accordingly, it is possible to reduce the erroneous hit signal HIT2 from being output to the cache controller 40A, using a simple control.

Figure 8:
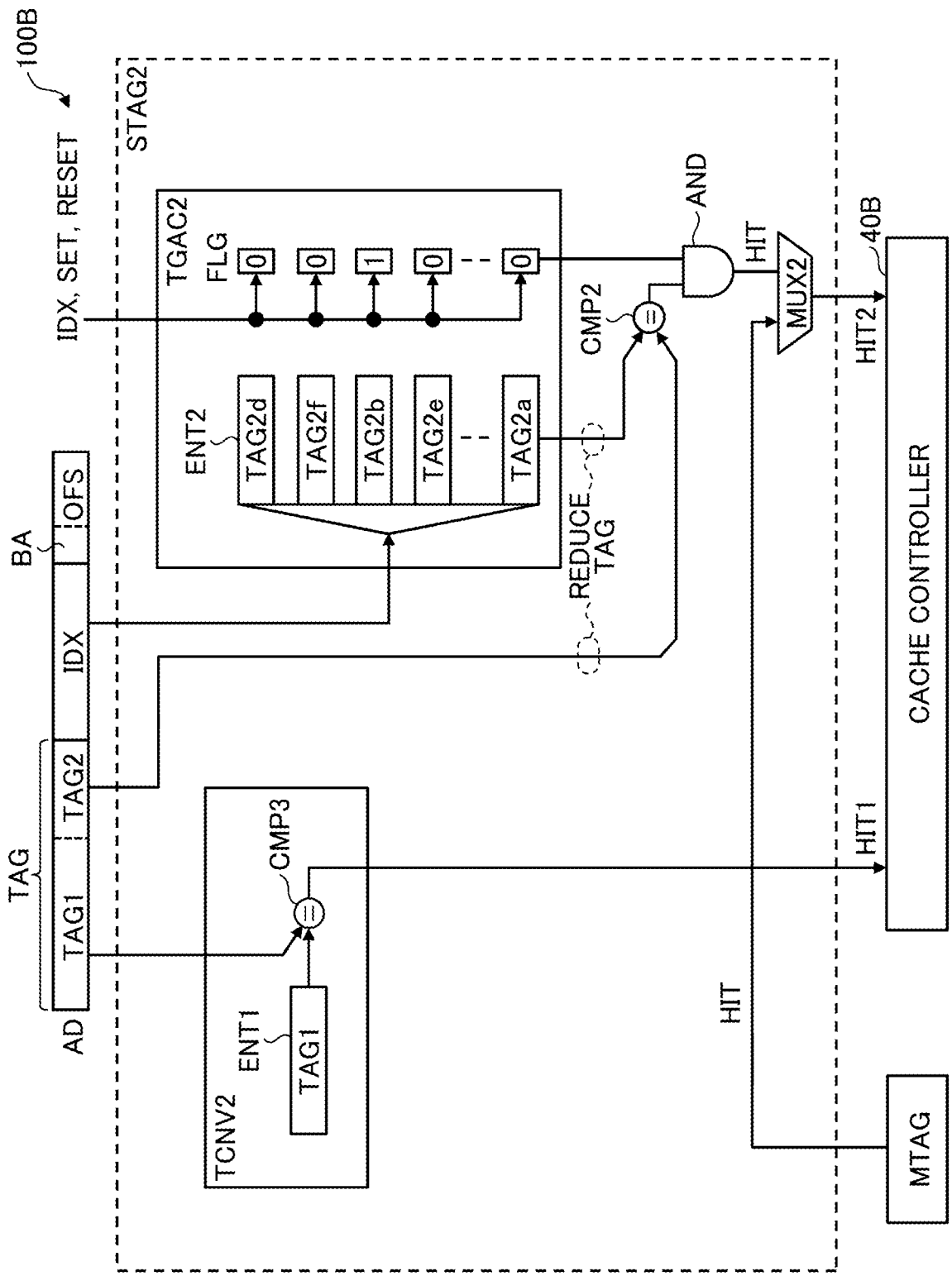
FIG. 8 is a block diagram illustrating an example of the sub tag unit of the processor according to a third embodiment.

FIG. 8 illustrates an example of the sub tag unit of the processor according to a third embodiment. In this embodiment, constituent elements that are the same as the constituent elements illustrated in FIG. 6 are designated by the same reference numerals, and a detailed description thereof will be omitted. A processor 100B illustrated in FIG. 8 is a CPU or the like having a function to perform a plurality of product sum operations in parallel, using the SIMD arithmetic instruction, for example. The processor 100B includes a sub tag unit STAG2 and a cache controller 40B in place of the sub tag unit STAG and the cache controller 40A illustrated in FIG. 5. In the processor 100B, the configuration, excluding the sub tag unit STAG2 and the cache controller 403, is the same as the configurations illustrated in FIG. 5 and FIG. 6.

The sub tag unit STAG2 includes a tag conversion portion TCNV2, a tag array cache TGAC2, a comparator CMP2, an AND circuit AND, and a multiplexer MUX2. The tag conversion unit TCNV2 includes one entry ENT1, and a comparator CMP3 corresponding to the entry ENT1, and does not include the encoder ENC and the OR circuit OR illustrated in FIG. 6. When the first tag address TAG1 held in the entry ENT1 matches the first tag address TAG1 included in the memory access request, the comparator CMP3 sets the hit signal HIT1 to the active level. When the first tag address TAG1 held in the entry ENT1 does not match the first tag address TAG1 included in the memory access request, the comparator CMP3 sets the hit signal HIT1 to the inactive level. The hit signal HIT1 is output to the cache controller 40B.

The tag array cache TGAC2 has the same configuration as the tag array cache TGAC illustrated in FIG. 6, except that no comparator CMP4 is provided and the entry ENT2 does not hold the identity information ID. The cache controller 40B sets the corresponding flag FLG to the logic "1" by outputting the index address IDX and the set signal SET to the tag array cache TGAC2. The cache controller 40B outputs the index address IDX and the reset signal RESET to the tag array cache TGAC2, to reset the corresponding flag FLG to the logic "0".

When the second tag address TAG2 included in the memory access request matches the second tag address TAG2 output from the entry ENT2 corresponding to the index address IDX included in the memory access request, the comparator CMP2 outputs the logic "1". On the other hand, when the second tag address TAG2 included in the memory access request does not match the second tag address TAG2 output from the entry ENT2 corresponding to the index address IDX included in the memory access request, the comparator CMP2 outputs the logic "0". The AND circuit AND sets the hit signal HIT to the active level when the AND circuit AND receives the logic "1" from each of the comparator CMP2 and the flag FLG. The operation of the multiplexer MUX2 is the same as the operation of the multiplexer MUX2 illustrated in FIG. 6. The cache controller 40B causes the multiplexer MUX2 to select the output of the AND circuit AND when the memory access request is issued.

The operation of the processor 100B according to this embodiment is similar to the operation illustrated in FIG. 7. However, the number of entries ENT1 of the tag conversion unit TCNV2 is smaller than the number of entries ENT1 in FIG. 6. The Tag array cache TGAC2 includes no comparator CMP4, and entry ENT2 does not hold the identification information ID. For this reason, the circuit scale of the sub tag unit STAG2 can be made smaller than the circuit scale of the sub tag unit STAG illustrated in FIG. 6.

As described above, in this embodiment, it is possible to obtain effects similar to the effects obtainable in the embodiments described above. Further, in this embodiment, because the circuit scale of the sub tag unit STAG2 can be made smaller than the circuit scale of the sub tag unit STAG, the circuit scale of the processor 100B can be made smaller than the circuit scale of the processor 100A. As a result, the manufacturing cost or the like of the processor 100B can be reduced.

Figure 9:
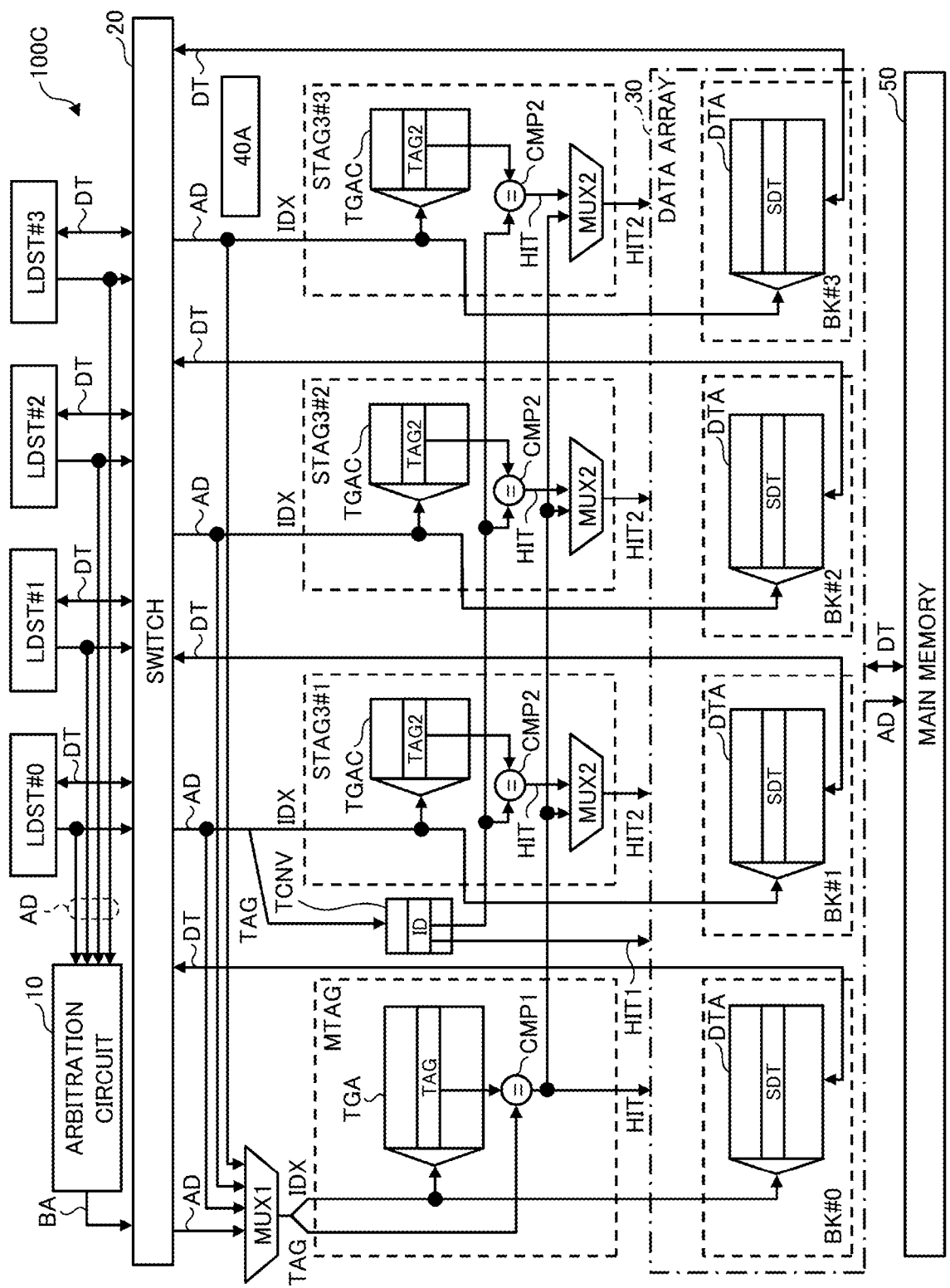
FIG. 9 is a block diagram illustrating an example of the processor according to a fourth embodiment.

FIG. 9 illustrates an example of the processor according to a fourth embodiment. In this embodiment, constituent elements that are the same as the constituent elements of the embodiments described above are designated by the same reference numerals, a detailed description thereof will be omitted. A processor 100C illustrated in FIG. 9 is a CPU or the like having a function to perform a plurality of product sum operations in parallel, using the SIMD arithmetic instruction, for example. The processor 100C includes a tag conversion unit TCNV that is provided in common with respect to three sub tag units STAG3 #1 through STAG3 #3. Otherwise, the configuration of the processor 100C is similar to the configuration of the processor 100A illustrated in FIG. 5. The configuration of the tag conversion unit TCNV is similar to the configuration of the tag conversion unit TCNV illustrated in FIG. 6. Further, although not illustrated in FIG. 9, the configuration of the cache 60 excludes the load store unit LDST and the main memory 50 from the configuration illustrated in FIG. 9.

Figure 10:
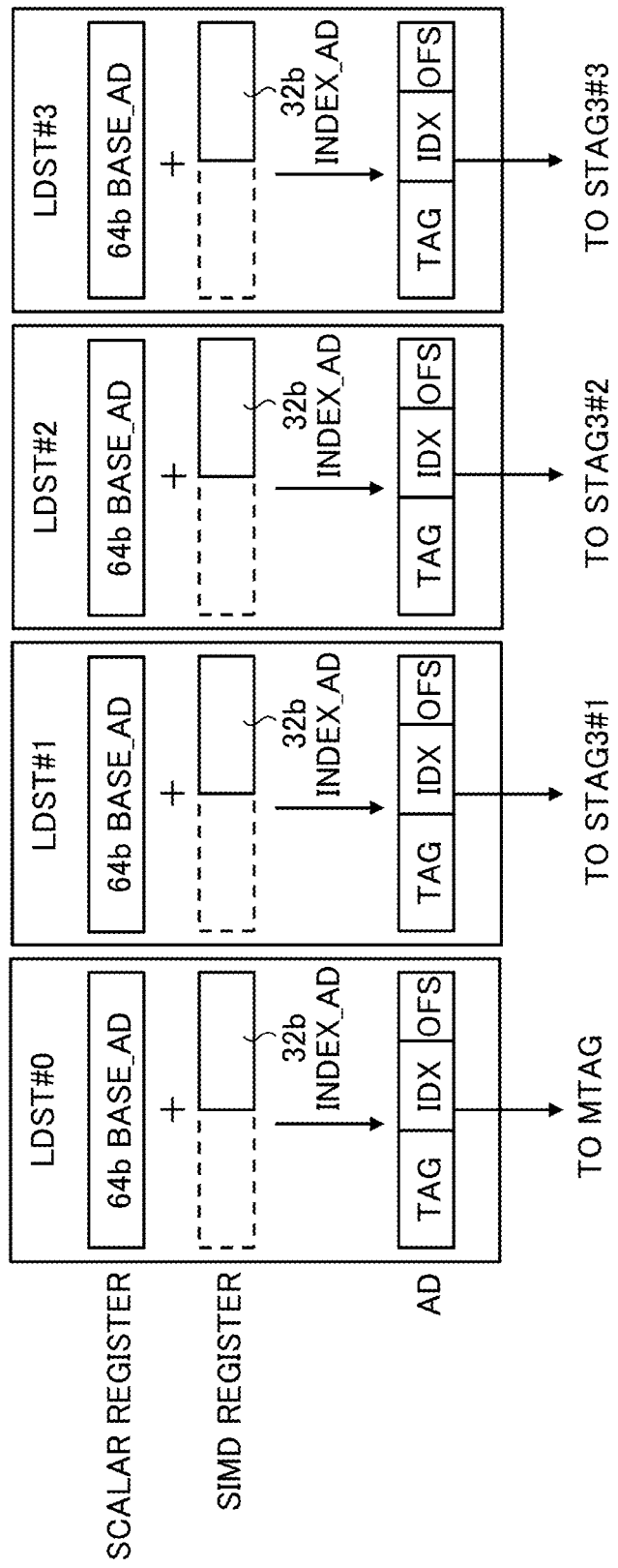
FIG. 10 is a diagram for explaining an example of address calculation in a load store unit illustrated in FIG. 9.

FIG. 10 illustrates an example of address calculation in the load store unit LDST illustrated in FIG. 9. For example, each load store unit LDST calculates the address AD of the memory access request by adding a value held in the scalar register and a value held in the SIMD register. For example, a 64-bit base address BASE_AD is held in the scalar register, and a 32-bit index address INDEX_AD (corresponding to lower bits) is held in the SIMD register.

In this case, the tag address TAG corresponding to upper bits of the address AD generated by each load store unit LOST becomes the same, except when a carry over occurs due to the addition. Accordingly, the information stored in the tag conversion unit TCNV illustrated in FIG. 9 can be common to the four load store units LDST. As a result, the tag conversion unit TCNV can be provided in common with respect to the plurality of sub tag units STAG3.

As described above, in this embodiment, it is also possible to obtain effects similar to the effects obtainable in the embodiments described above. Further, in this embodiment, because the tag converting unit TCNV is provided in common with respect to the plurality of sub tag units STAG3, the circuit scale of the sub tag unit STAG3 can be made smaller than the circuit scale of the sub tag unit STAG2. As a result, the circuit scale of the processor 100C can be further reduced from the circuit scale of the processor 100A, it is possible to reduce the manufacturing cost or the like the processor 100C.

Figure 11:
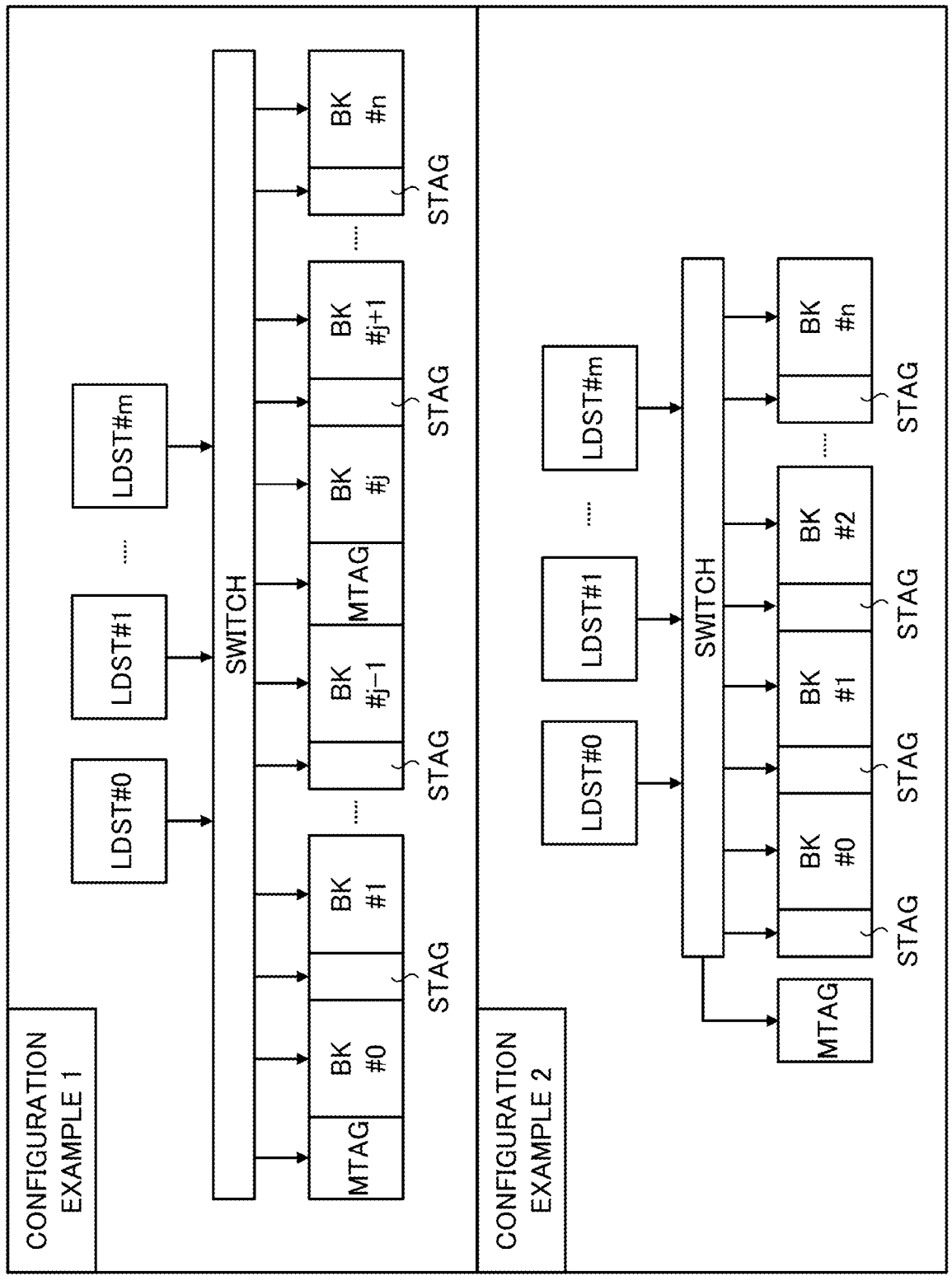
FIG. 11 is a block diagram illustrating examples of configurations of a main tag unit and the sub tag unit according to a fifth embodiment.
Figure 12:
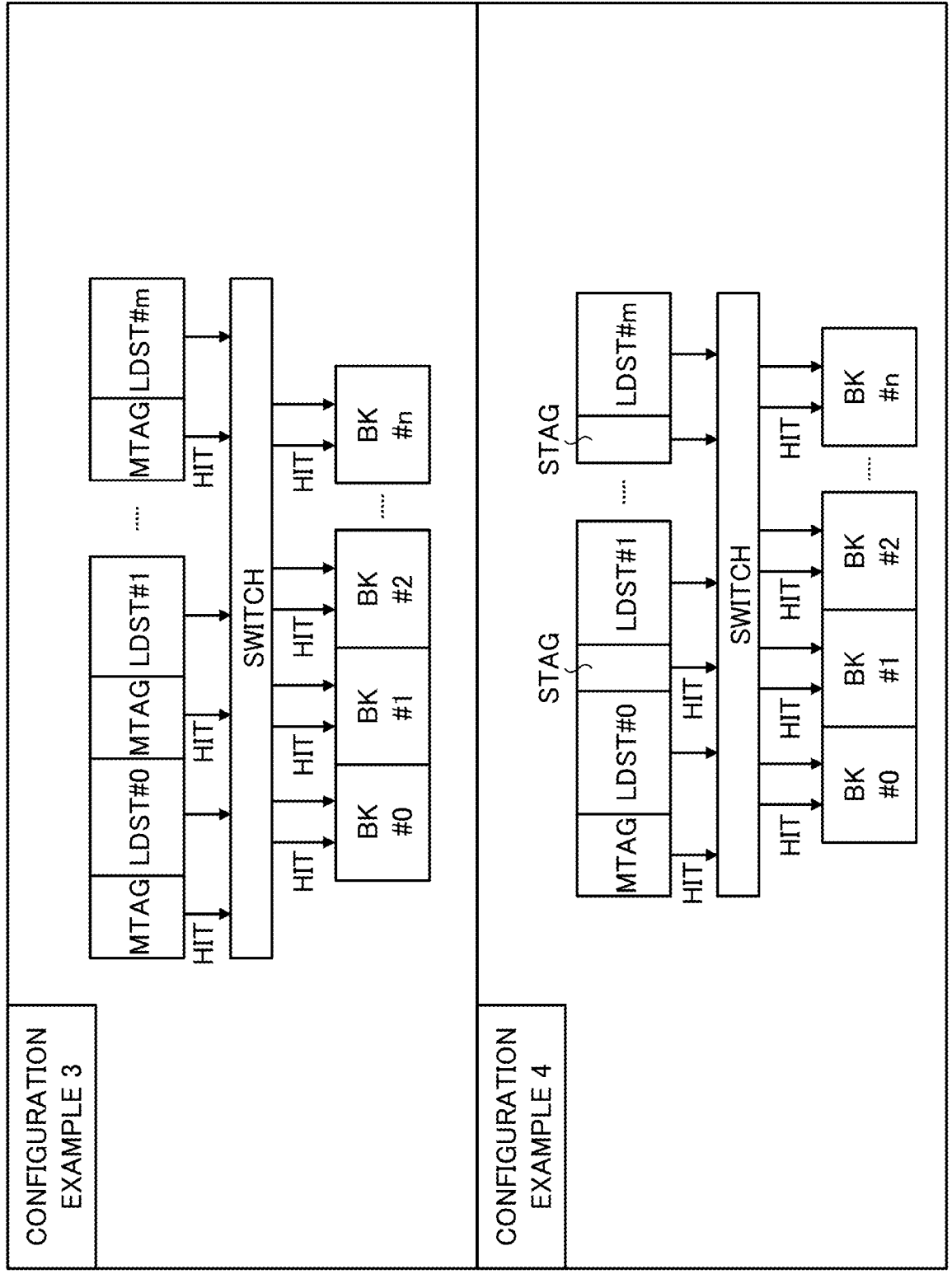
FIG. 12 is a block diagram illustrating examples of the configurations of the main tag unit and the sub tag unit according to a sixth embodiment.
Figure 13:
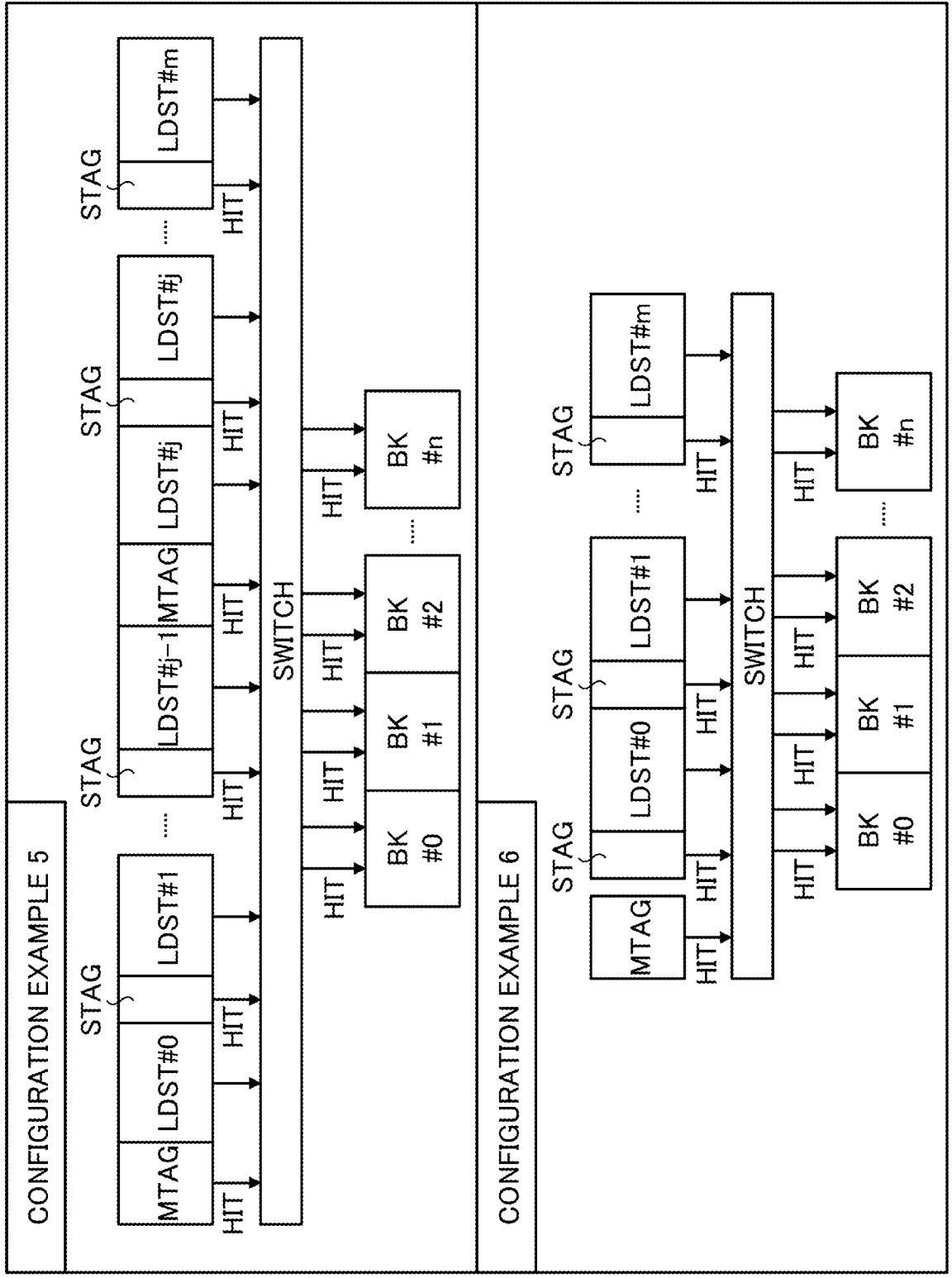
FIG. 13 is a block diagram illustrating examples of the configurations of the main tag unit and the sub tag unit according to a seventh embodiment.

FIG. 11 through FIG. 13 illustrate examples of the configurations of the main tag unit MTAG and the sub tag unit STAG according to fifth, sixth, and seventh embodiments. In a configuration example 1 illustrated in FIG. 11, each of the plurality of main tag unit MTAG is provided in correspondence with a predetermined number of banks BK. For example, as illustrated in FIG. 7, when the cache miss occurs in the entry ENT1 of the tag conversion unit TCNV in step S22, the determination of the cache hit or the cache miss is performed using the tag array TGA of the main tag unit MTAG. For this reason, when the cache miss occurs in the entry ENT1 of the tag conversion unit TCNV of the plurality of sub tag units STAG, a contention occurs in the tag array TGA, thereby delaying the determination of the cache hit or the cache miss.

In addition, during the determination of the main tag unit MTAG with respect to the bank BK #0, the determination of the cache hit or the cache miss by the main tag unit MTAG based on the provisional cache miss of the entry ENT1 of the tag conversion unit TCNV is caused to wait, in the configuration example 1, by providing the plurality of main tag units MTAG, the contention of the main tag units MTAG caused by the provisional cache miss of the entry ENT1 of the tag conversion portion TCNV can be reduced. Moreover, it is possible to reduce the possibility of conflict between the determination of the cache hit or the cache miss of the bank BK #0, and the determination of the cache hit or the cache miss due to the cache miss of the entry ENT1 of the tag conversion unit TCNV.

In a second configuration example illustrated in FIG. 11, the sub tag unit STAG is provided in correspondence with each of the banks BK, and the main tag unit MTAG is provided independently of the plurality of banks BK. Hence, it is possible to repeatedly arrange the sub tag unit STAG and the bank BK in pairs, and the design can be made by considering a symmetry of the circuit arrangement or layout. As a result, a layout design of the processor can be facilitated, or electrical characteristics such as frequency characteristics or the like of the processor can be improved.

In configuration examples 3 through 6 illustrated in FIG. 12 and FIG. 13, the main tag units MTAG and the sub tag units STAG are disposed on the side of the switch closer to the load store units LDST. That is, the main tag units MTAG and the sub tag units STAG receive the memory access requests from the plurality of load store units LDST before being supplied to the switch. In FIG. 12 and FIG. 13, the hit signals HIT supplied to the banks BK #1 through BK #n, other than the bank BK #0, indicate the hit signals HIT1 and HIT2.

For example, when the number m+1 of the load store units LDST is smaller than the number n+1 of the banks BK, the configuration examples 3 through 6 can reduce the total number of the main tag units MTAG and the sub tag units STAG compared to the configuration examples 1 and 2. For this reason, the configuration examples 3 through 6 can further reduce the circuit scale of the processor compared to the configuration examples 1 and 2.

In the configuration example 3 illustrated in FIG. 12, the main tag unit MTAG is provided in correspondence with each of the load store units LDST. In the configuration example 4 illustrated in FIG. 12, the main tag unit MTAG is provided in correspondence with the load store unit LDST #0, and the sub tag unit STAG is provided in correspondence with to each of the load store units LDST #2 through LDST #m.

In the configuration example 5 illustrated in FIG. 13, a plurality of main tag units MTAG is provided. Accordingly, similar to the configuration example illustrated in FIG. 12, it is possible to reduce the possibility of conflict of the plurality of memory access requests in the main tag unit MTAG. In the configuration example 6 illustrated in FIG. 13, the sub tag unit STAG is provided in correspondence with to each of the load store units LDST, and the main tag unit MTAG is provided independently of the plurality of load store units LDST. Hence, it is possible to repeatedly arrange the sub tag units STAG and the load store units LDST in pairs, and the design can be made by considering the symmetry of the circuit arrangement or layout. As a result, the layout design of the processor can be facilitated, or the electrical characteristics such as the frequency characteristics or the like of the processor can be improved.

The sub tag unit STAG illustrated in FIG. 1 or FIG. 5, the sub tag unit STAG2 illustrated in FIG. 8, or the sub tag unit STAG3 illustrated in FIG. 9 may be used for the sub tag unit STAG in each of the configuration examples 1, 2, and 4 through 6. When the sub tag unit STAG3 illustrated in FIG. 9 is used, the tag conversion portion TCNV is provided independently of the sub tag unit STAG3.

Figure 14:
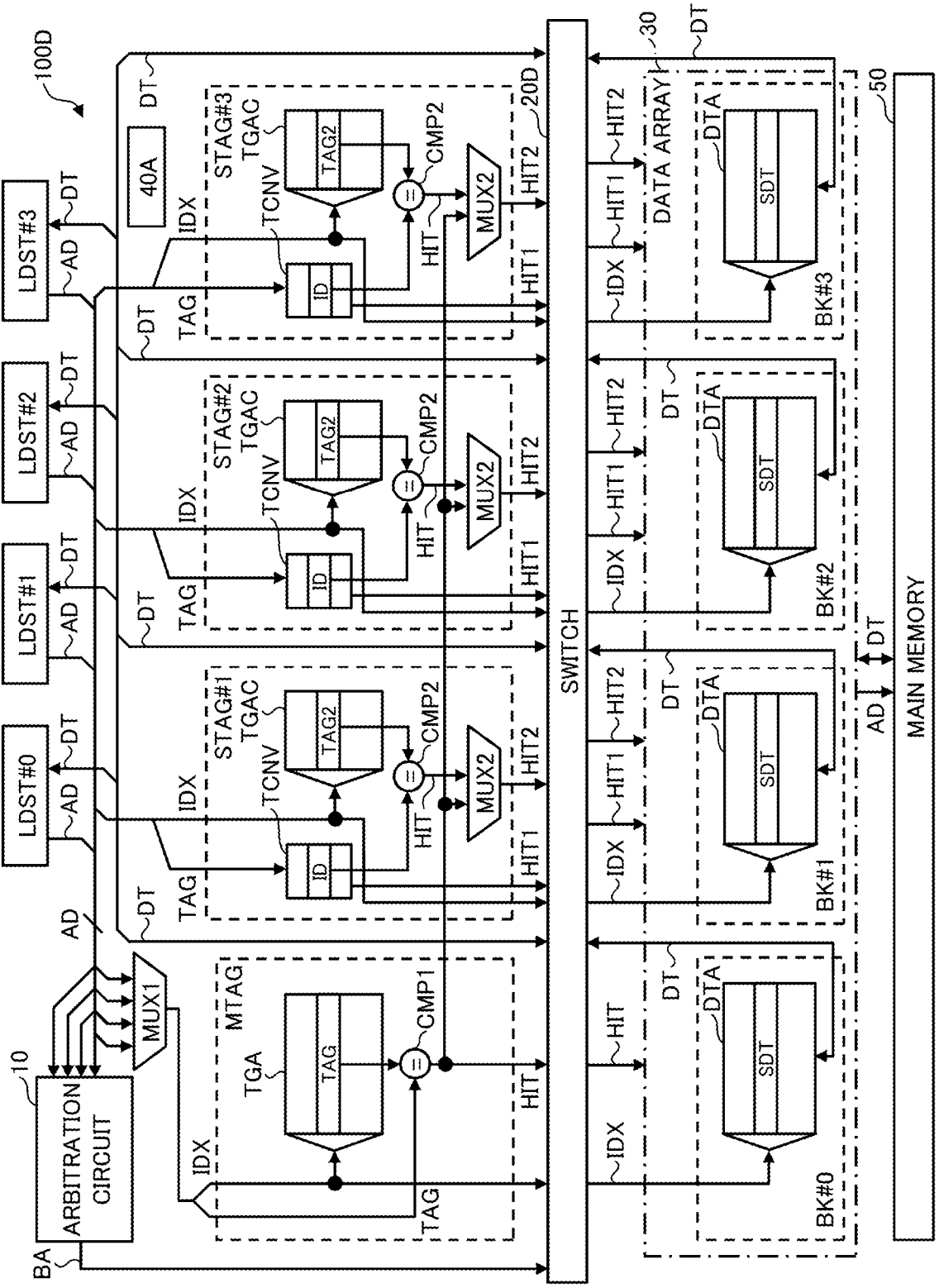
FIG. 14 is a block diagram illustrating an example of the processor according to a configuration example 4 illustrated in FIG. 12.

FIG. 14 illustrates an example of the processor according to the configuration example 4 illustrated in FIG. 12. In this embodiment, constituent elements that are the same as the constituent elements of the embodiments described above are designated by the same reference numerals, a detailed description thereof will be omitted. In a processor 100D illustrated in FIG. 14, the main tag unit MTAG, the sub tag units STAG, and a multiplexer MUX1 are disposed between the load store units LDST and a switch 20D. In order to simplify the description, it is assumed that the processor 100D includes three lead store units LDST #1 through LDST #3, three sub tag units STAG #1 through STAG #3, and four banks BK #0 through BK #3. Although not illustrated in FIG. 14, the cache 60 has a configuration that excludes the load store units LDST and main memory 50 from the elements illustrated in FIG. 14.

As illustrated in the configuration example 4 illustrated in FIG. 12, the main tag unit MTAG is provided in correspondence with the load store unit LDST #0. The sub tag units STAG #1 through STAG #3 are provided in correspondence with the load store units LDST #1 through LDST #3, respectively. The memory access operation of the processor 100D is similar to the memory access operation illustrated in FIG. 7.

The switch 20D receives the index address IDX and the hit signal HIT from the main tag unit MTAG, and the index addresses IDX and the hit signals HIT1 and HIT2 from the sub tag units STAG, in addition to the addresses AD from the load store units LOST and the bank address BA from the arbitration unit 10. The switch 20D outputs the received index address IDX and the hit signal HIT or the hit signals HIT1 and HIT2 to a corresponding bank BK of the cache 60, according to the bank address BA. In addition, the switch 20D outputs the control signals for the main tag unit MTAG and the sub tag units STAG, generated by the cache controller 40, to the main tag unit MTAG and the sub tag units STAG.

Figure 15:
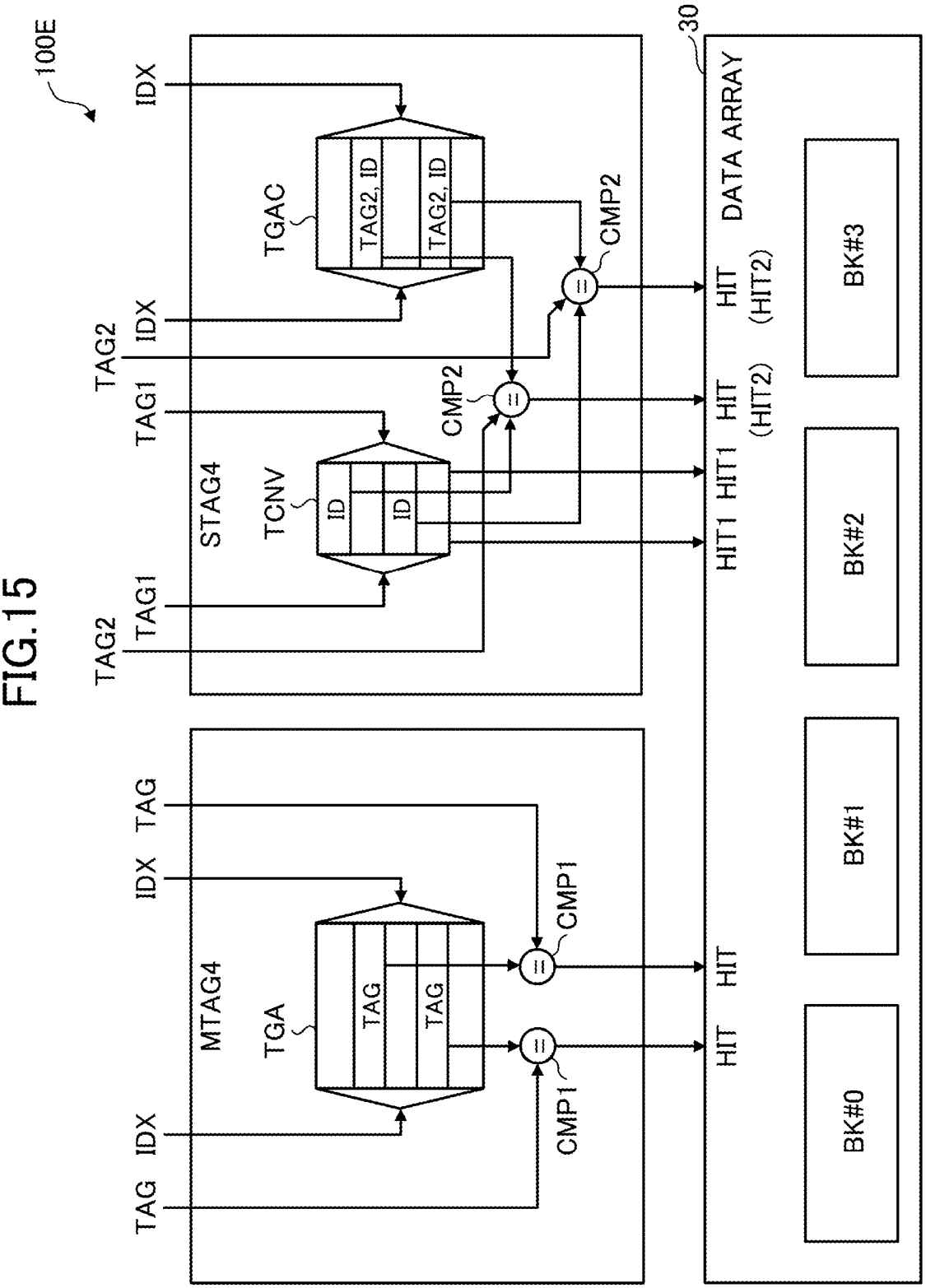
FIG. 15 is a block diagram illustrating an example of the main tag unit and the sub tag unit of the processor according to an eighth embodiment.

FIG. 15 illustrates an example of the main tag unit MTAG and the sub tag unit STAG in the processor according to an eighth embodiment. The main tag unit MTAG and the sub tag unit STAG may be shared among the plurality of banks BK. A processor 100E according to this embodiment includes a main tag unit MTAG4 that is shared by a pair of mutually adjacent banks BK, and a sub tag unit STAG4 that is shared by another pair of mutually adjacent banks BK other than the pair of mutually adjacent banks BK shared by the main tag unit MTAG4. In the processor 100E, the configuration excluding the main tag unit MTAG4 and the sub tag unit STAG4 is similar to the configuration of the processor 100A illustrated in FIG. 5. FIG. 15 illustrates an example in which the main tag unit MTAG is shared by the pair of mutually adjacent banks BK, and the sub tag unit STAG is shared by the other pair of mutually adjacent banks BK, but each of the main tag unit MTAG and the sub tag unit STAG may be shared among an arbitrary banks BK.

For example, the main tag unit MTAG4 outputs the hit signals HIT with respect to the banks BK #0 and BK #1. The sub tag unit STAG4 outputs the hit signals HIT1 and HIT (HIT2) with respect to the banks BK #2 and BK #3. In a case where the processor 100E includes eight banks BK #0 through BK #7, a sub tag unit STAG4 corresponding to the banks BK #4 and BK #5, and a sub tag unit STAG4 corresponding to the banks BK #6 and BK #7, may be provided.

For example, the main tag unit MTAG4 is a multi-port type, and can simultaneously receive the tag addresses TAG and the index addresses IDX output from two load store units LDST. In addition, the main tag unit MTAG4 can output the hit signals HIT corresponding to the two load store units LDST, independently of each other.

The sub tag unit STAG4 is a multi-port type, and can simultaneously receive the tag addresses TAG (TAG1, TAG2) and the index addresses IDX output from the load store units LDST. Further, the sub tag unit STAG4 can output the hit signals HIT1 and HIT (HIT2) corresponding to the two load store units LDST, independently of each other.

In this embodiment, the multi-port type main tag unit MTAG 4 and the multi-port type sub tag unit STAG 4 are provided. For this reason, a total number of the main tag unit MTAG4 and the sub tag units STAG4 can be reduced compared to the total number of the main tag unit MTAG and the sub tag units STAG illustrated in FIG. 5. Hence, the circuit scale of the main tag unit MTAG4 and the sub tag units STAG4 can be reduced, thereby enabling the circuit scale of the processor 100E to be reduced.

The processor 100E may include the main tag unit MTAG 4 illustrated in FIG. 15, and the sub tag units STAG illustrated in FIG. 5. In addition, the processor 100E may include the main tag unit MTAG illustrated in FIG. 5, and the sub tag units STAG4 illustrated in FIG. 15. Moreover, the main tag unit MTAG 4 may be disposed in place of the other main tag unit MTAG in each of the embodiments described above. The sub tag units STAG4 may be disposed in place of the other sub tag units STAG, STAG2, and STAG3 in each of the embodiments described above.

The main tag unit MTAG4 illustrated in FIG. 15 may be provided in place of the main tag unit MTAG in any of the configuration example 1 illustrated in FIG. 11, the configuration examples 3 and 4 illustrated in FIG. 12, and the configuration example 5 illustrated in FIG. 13. The sub tag unit STAG4 illustrated in FIG. 15 may be provided in place of the sub tag unit STAG in any of the configuration examples 1 through 6 illustrated in FIG. 11 through 13.

As described above, in this embodiment, it is possible to obtain effects similar to the effects obtainable in the embodiments described above. In this embodiment, it is possible to reduce the circuit scale of the processor 100E by providing at least one of the multi-port type main tag unit MTAG4 and the multi-port type sub tag units STAG4.

FIG. 16 illustrates an example of a tag array/data array ratio for each configuration of the cache. FIG. 16 illustrates an example in which only the tag array TGA is used, and the tag array cache TGAC illustrated in FIG. 1 or the like is not used, A reference symbol (A) indicating the cache line size will be used in the description of FIG. 17 that will be given below.

When the tag array TGA is provided in correspondence with to each of the banks BK, the ratio of the tag array TGA with respect to the data array DTA for each bank BK becomes higher as the number of banks BK increases, and becomes higher as the cache line size becomes smaller. The ratio of the tag array TGA with respect to the data array DTA becomes higher as the number of ways increases, and becomes higher as a number of bits F of a physical address increases. The number of bits (a) of the tag array TGA can be represented by the following formula (1).

$$(a) = F + \log_2(\text{number of ways}) - \log_2(\text{cache size}) \quad (1)$$

Further, the ratio of the tag array TGA with respect to the data array DTA becomes higher as the cache size decreases.

FIG. 17 illustrates an example of effects of improving the tag array/data array ratio in a case where the tag array cache is provided. In a configuration (A) of the cache illustrated in FIG. 16, the tag array/data array ratio is 56.3%. In contrast, in the configuration of the cache illustrated in FIG. 1 using the tag array cache TGAC, the tag array/data array ratio can be reduced to 16.9% that is approximately ⅓ that of the configuration (A) illustrated in FIG. 16. Further, in the configuration of the cache according to the configuration example 4 illustrated in FIG. 12 using the tag array cache TGAC, the tag array/data array ratio can be reduced to 9.1% that is approximately ⅙ that of the configuration (A) illustrated in FIG. 16.

According to the embodiments described above, it is possible to reduce the ratio of the size of the determination unit that determines the cache hit of the cache including the plurality of banks, with respect to the size of the cache.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first", "second", "third" . . . , and "eighth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor comprising:
a plurality of request issuing units each configured to issue a memory access request to a storage;
a data array including a plurality of banks each configured to hold sub data divided from data read from the storage based on the memory access request;
a switch configured to transfer the memory access request to one of the plurality of banks;
at least one first determination unit, including a first holding unit that holds a tag address included in an access address included in the memory access request for each value of an index address in the access address, and configured to determine a cache hit indicating that an access target data is held in the data array when the tag address included in the access address matches the tag address held in the first holding unit in correspondence with the index address included in the access address;
at least one second determination unit, including a second holding unit that holds identification information identifying a first tag address included in the tag address, and a second tag address included in the tag address, for each value of the index address, and configured to determine a cache hit when the identification information corresponding to the first tag address included in the access address and the second tag address included in the access address, match the identification information and the second tag address held in the second holding unit in correspondence with the index address included in the access address, respectively; and
a cache controller configured to make access to the data array or the storage, based on a determination result of the first determination unit or the second determination unit.

2. The processor as claimed in claim 1, wherein
the second determination unit includes a third holding unit including a plurality of entries that hold the first tag address,
the identification information that identifies the first tag address is identification information that identifies the entries of the third holding unit, and
the second determination unit determines a cache hit when the identification information that identifies the entries of the third holding unit holding the first tag address included in the access address, and the second tag address included in the access address, are stored in the second holding unit in correspondence with the index address included in the access address.

3. The processor as claimed in claim 2, wherein the third holding unit is provided in common with respect to a plurality of second determination units.

4. The processor as claimed in claim 2, wherein the cache controller causes the first determination unit to determine the cache hit based on the access address when the first tag address included in the access address is not held in the third holding unit.

5. The processor as claimed in claim 1, wherein the second holding unit holds a flag indicating that the identification information therein is valid, for each value of index address.

6. The processor as claimed in claim 1, wherein the first determination unit and the second determination unit receive the memory access request from each of the plurality of request issuing units via the switch.

7. The processor as claimed in claim 6, wherein
the first determination unit is provided in correspondence with each of the plurality of the banks, and
the second determination unit is provided in correspondence with a bank that does not correspond to the first determination unit.

8. The processor as claimed in claim 6, wherein
the first determination unit is provided independently of the plurality of banks, and
the second determination unit is provided in correspondence with each of the plurality of banks.

9. The processor as claimed in claim 6, wherein
the second determination unit is shared by two or more banks among the plurality of the banks, and
the first determination unit is provided in correspondence with at least one of the plurality of banks other than the two or more banks shared by the second determination unit.

10. The processor as claimed in claim 6, wherein
the first determination unit is shared by two or more banks among the plurality of the banks, and
the second determination unit is provided in correspondence with at least one of the plurality of banks other than the two or more banks shared by the first determination unit.

11. The processor as claimed in claim 1, wherein the first determination unit and the second determination unit receive the memory access request from each of the plurality of request issuing units before the memory access request is supplied to the switch.

12. The processor as claimed in claim 11, wherein
the first determination unit is provided in correspondence with two or more request issuing units among the plurality of the request issuing units, and
the second determination unit is provided in correspondence with a request issuing unit that does not correspond to the first determination unit.

13. The processor as claimed in claim 11, wherein
the first determination unit is provided independently of the plurality of request issuing units, and
the second determination unit is provided in correspondence with each of the plurality of request issuing units.

14. The processor as claimed in claim 11, wherein
the second determination unit is shared by a pair of mutually adjacent request issuing units among the plurality of request issuing units, and
the first determination unit is provided in correspondence with at least one of the plurality of request issuing units other than the pair of mutually adjacent request issuing units sharing the second determination unit.

15. The processor as claimed in claim 11, wherein
the first determination unit is shared by a pair of mutually adjacent request issuing units among the plurality of request issuing units, and
the second determination unit is provided in correspondence with at least one of the plurality of request issuing units other than the pair of mutually adjacent request issuing units sharing the first determination unit.

16. An arithmetic processing method to be implemented in a processor including a plurality of request issuing units each configured to issue a memory access request to a storage, a data array including a plurality of banks each configured to hold sub data divided from data read from the storage based on the memory access request, and a switch configured to transfer the memory access request to one of the plurality of banks, the arithmetic processing method comprising:
determining, by at least one first determination unit of the processor, including a first holding unit that holds a tag address included in an access address included in the memory access request for each value of an index address in the access address, a cache hit indicating that an access target data is held in the data array when the tag address included in the access address matches the tag address held in the first holding unit in correspondence with the index address included in the access address;
determining, by at least one second determination unit of the processor, including a second holding unit that holds identification information identifying a first tag address included in the tag address, and a second tag address included in the tag address, for each value of the index address, a cache hit when the identification information corresponding to the first tag address included in the access address and the second tag address included in the access address, match the identification information and the second tag address held in the second holding unit in correspondence with the index address included in the access address, respectively; and
making access to the data array or the storage, by a cache controller of the processor, based on a determination result of the first determination unit or the second determination unit.

* * * * *